(12) United States Patent
Chappel

(10) Patent No.: US 7,822,621 B1
(45) Date of Patent: Oct. 26, 2010

(54) METHOD OF AND SYSTEM FOR POPULATING KNOWLEDGE BASES USING RULE BASED SYSTEMS AND OBJECT-ORIENTED SOFTWARE

(75) Inventor: Oscar A. Chappel, Odessa, FL (US)

(73) Assignee: Perot Systems Corporation, Plano, TX (US)

( * ) Notice: Subject to any disclaimer, the term of this patent is extended or adjusted under 35 U.S.C. 154(b) by 1817 days.

(21) Appl. No.: 10/690,258

(22) Filed: Oct. 21, 2003

Related U.S. Application Data

(63) Continuation-in-part of application No. 10/336,104, filed on Jan. 3, 2003, which is a continuation-in-part of application No. 09/859,320, filed on May 16, 2001, now Pat. No. 7,236,940.

(51) Int. Cl.
  *G06Q 10/00* (2006.01)
  *G06Q 50/00* (2006.01)
(52) U.S. Cl. .................. 705/2; 705/3; 705/4; 704/9; 706/45; 707/3
(58) Field of Classification Search ............. 705/2–4; 704/9; 706/45; 707/3
  See application file for complete search history.

(56) References Cited

U.S. PATENT DOCUMENTS

| 4,684,044 | A | 8/1987 | Foster |
| 4,713,775 | A | 12/1987 | Scott et al. |
| 4,860,213 | A | 8/1989 | Bonissone |
| 4,912,669 | A | 3/1990 | Iwamoto et al. |
| 4,920,499 | A | 4/1990 | Skeirik |
| 4,970,658 | A | 11/1990 | Durbin et al. |
| 5,301,105 | A | 4/1994 | Cummings |
| 5,390,330 | A | 2/1995 | Talati |
| 5,483,443 | A | 1/1996 | Milstein |
| 5,488,714 | A | 1/1996 | Skidmore |
| 5,523,942 | A | 6/1996 | Tyler et al. |
| 5,553,282 | A | 9/1996 | Parrish et al. |
| 5,577,169 | A | 11/1996 | Prezioso |
| 5,619,709 | A | 4/1997 | Caid |
| 5,671,360 | A | 9/1997 | Hambrick et al. |

(Continued)

FOREIGN PATENT DOCUMENTS

JP 03-020866 1/1991

(Continued)

OTHER PUBLICATIONS

Gil Broza, "Inter-Language Regularity: The Transforming Learning Problem," Hebrew University of Jerusalem, Oct. 1998 pp. 1-60.

(Continued)

*Primary Examiner*—Linh Michelle Le
(74) *Attorney, Agent, or Firm*—Winstead PC

(57) ABSTRACT

A method of populating a knowledge base used in validating medical claims includes creating and/or editing at least one claim element via at least one rule to determine a match between a syntax of the translated edit and a syntax of the rule. A method call is executed responsive to the created or edited claim element resulting in at least one match being determined. The knowledge base is populated responsive to the executing step.

22 Claims, 9 Drawing Sheets

U.S. PATENT DOCUMENTS

| | | |
|---|---|---|
| 5,724,488 A | 3/1998 | Prezioso |
| 5,724,983 A | 3/1998 | Selker |
| 5,765,140 A | 6/1998 | Knudson et al. |
| 5,772,585 A | 6/1998 | Lavin |
| 5,784,635 A | 7/1998 | McCallum |
| 5,794,178 A | 8/1998 | Caid |
| 5,809,476 A | 9/1998 | Ryan |
| 5,809,493 A | 9/1998 | Ahamed et al. |
| 5,819,228 A | 10/1998 | Spiro |
| 5,826,239 A | 10/1998 | Du et al. |
| 5,835,897 A | 11/1998 | Dang |
| 5,890,129 A | 3/1999 | Spurgeon |
| 5,903,453 A | 5/1999 | Stoddard II |
| 5,908,383 A | 6/1999 | Brynjestad |
| 5,916,818 A | 6/1999 | Irsch |
| 5,924,074 A | 7/1999 | Evans |
| 5,930,798 A | 7/1999 | Lawler |
| 5,956,689 A | 9/1999 | Everhart, III |
| 5,960,196 A | 9/1999 | Carrier, III et al. |
| 6,049,794 A | 4/2000 | Jacobs |
| 6,061,506 A | 5/2000 | Wollaston et al. |
| 6,067,466 A | 5/2000 | Selker |
| 6,067,541 A | 5/2000 | Raju et al. |
| 6,070,134 A | 5/2000 | Richardson et al. |
| 6,073,107 A | 6/2000 | Minkiewicz et al. |
| 6,082,776 A | 7/2000 | Feinberg |
| 6,088,677 A | 7/2000 | Spurgeon |
| 6,101,481 A | 8/2000 | Miller et al. |
| 6,115,646 A | 9/2000 | Fiszman et al. |
| 6,125,350 A | 9/2000 | Dirbas |
| 6,137,911 A | 10/2000 | Zhilyaev |
| 6,151,585 A | 11/2000 | Altschuler et al. |
| 6,161,113 A | 12/2000 | Mora et al. |
| 6,182,047 B1 | 1/2001 | Dirbas |
| 6,266,645 B1 | 7/2001 | Simpson |
| 6,272,678 B1 | 8/2001 | Imachi et al. |
| 6,278,977 B1 | 8/2001 | Agrawal et al. |
| 6,279,042 B1 | 8/2001 | Ouchi |
| 6,292,771 B1 | 9/2001 | Haug |
| 6,311,173 B1 | 10/2001 | Levin et al. |
| 6,314,556 B1 | 11/2001 | Debusk |
| 6,336,217 B1 | 1/2002 | D'Anjou et al. |
| 6,347,329 B1 | 2/2002 | Evans |
| 6,353,817 B1 | 3/2002 | Jacobs |
| 6,366,683 B1 | 4/2002 | Langlotz |
| 6,370,511 B1 | 4/2002 | Dang |
| 6,381,576 B1 | 4/2002 | Gilbert |
| 6,381,610 B1 | 4/2002 | Gundewar et al. |
| 6,411,936 B1 | 6/2002 | Sanders |
| 6,415,295 B1 | 7/2002 | Feinberg |
| 6,430,538 B1 | 8/2002 | Bacon et al. |
| 6,484,178 B1 | 11/2002 | Bence, Jr. et al. |
| 6,493,731 B1 | 12/2002 | Jones et al. |
| 6,551,266 B1 | 4/2003 | Davis |
| 6,556,964 B2 | 4/2003 | Haug |
| 6,578,006 B1 | 6/2003 | Saito et al. |
| 6,581,040 B1 | 6/2003 | Wright et al. |
| 6,594,673 B1 | 7/2003 | Smith et al. |
| 6,611,726 B1 | 8/2003 | Crosswhite |
| 6,715,130 B1 | 3/2004 | Eiche et al. |
| 6,725,287 B1 | 4/2004 | Loeb et al. |
| 6,810,376 B1 | 10/2004 | Guan et al. |
| 6,879,959 B1 | 4/2005 | Chapman et al. |
| 6,901,372 B1 | 5/2005 | Helzerman |
| 6,901,399 B1 | 5/2005 | Corston et al. |
| 6,904,454 B2 | 6/2005 | Stickler et al. |
| 6,915,254 B1 | 7/2005 | Heinze et al. |
| 6,950,813 B2 | 9/2005 | Srinivasa et al. |
| 6,999,959 B1 | 2/2006 | Lawrence et al. |
| 7,031,930 B2 | 4/2006 | Freeman et al. |
| 7,092,895 B2 | 8/2006 | Chappel et al. |
| 7,225,197 B2 | 5/2007 | Lissar et al. |
| 7,571,107 B1 * | 8/2009 | Jones et al. ............... 705/4 |
| 2001/0018739 A1 | 8/2001 | Anderson |
| 2001/0034621 A1 | 10/2001 | Kirsh et al. |
| 2001/0037224 A1 | 11/2001 | Eldridge et al. |
| 2001/0041992 A1 | 11/2001 | Lewis |
| 2001/0051879 A1 | 12/2001 | Johnson |
| 2001/0051880 A1 | 12/2001 | Schurenberg |
| 2002/0007284 A1 | 1/2002 | Schurenberg |
| 2002/0010595 A1 | 1/2002 | Kapp |
| 2002/0022972 A1 | 2/2002 | Costello |
| 2002/0035486 A1 | 3/2002 | Huyn |
| 2002/0035491 A1 | 3/2002 | Dombroski |
| 2002/0040359 A1 | 4/2002 | Green et al. |
| 2002/0046346 A1 | 4/2002 | Evans |
| 2002/0052551 A1 | 5/2002 | Sinclair |
| 2002/0052760 A1 | 5/2002 | Munoz |
| 2002/0052858 A1 | 5/2002 | Goldman et al. |
| 2002/0069056 A1 | 6/2002 | Nofsinger |
| 2002/0069057 A1 | 6/2002 | Kapust |
| 2002/0069079 A1 | 6/2002 | Vega |
| 2002/0069085 A1 | 6/2002 | Engel |
| 2002/0069089 A1 | 6/2002 | Larkin |
| 2002/0070226 A1 | 6/2002 | Liff |
| 2002/0077849 A1 | 6/2002 | Baruch |
| 2002/0077945 A1 | 6/2002 | Leymann et al. |
| 2002/0077994 A1 | 6/2002 | Dombroski |
| 2002/0082825 A1 | 6/2002 | Rowlandson |
| 2002/0087358 A1 | 7/2002 | Gilbert |
| 2002/0087533 A1 | 7/2002 | Norman |
| 2002/0091552 A1 | 7/2002 | Dombroski |
| 2002/0093189 A1 | 7/2002 | Krupa |
| 2002/0099686 A1 | 7/2002 | Schwartz |
| 2002/0100762 A1 | 8/2002 | Liff |
| 2002/0103680 A1 | 8/2002 | Newman |
| 2002/0107452 A1 | 8/2002 | Kwong |
| 2002/0111826 A1 | 8/2002 | Potter |
| 2002/0116466 A1 | 8/2002 | Trevithick et al. |
| 2002/0120466 A1 | 8/2002 | Finn |
| 2002/0124002 A1 | 9/2002 | Su |
| 2002/0128816 A1 | 9/2002 | Haug |
| 2002/0128868 A1 | 9/2002 | Lonski |
| 2002/0128874 A1 * | 9/2002 | McIntosh et al. ........ 705/4 |
| 2002/0133503 A1 | 9/2002 | Amar et al. |
| 2002/0138306 A1 | 9/2002 | Sabovich |
| 2002/0138649 A1 | 9/2002 | Cartmell |
| 2002/0147615 A1 | 10/2002 | Doerr |
| 2002/0147617 A1 | 10/2002 | Schoenbaum |
| 2002/0147710 A1 | 10/2002 | Hu |
| 2002/0148893 A1 | 10/2002 | Walsh |
| 2002/0150966 A1 | 10/2002 | Muraca |
| 2002/0156078 A1 | 10/2002 | Comings |
| 2002/0159641 A1 | 10/2002 | Whitney et al. |
| 2002/0159642 A1 | 10/2002 | Whitney |
| 2002/0161606 A1 | 10/2002 | Bennett |
| 2002/0165735 A1 | 11/2002 | Stangel |
| 2002/0165738 A1 | 11/2002 | Dang |
| 2002/0165739 A1 | 11/2002 | Guyan |
| 2002/0165839 A1 | 11/2002 | Taylor et al. |
| 2002/0169737 A1 | 11/2002 | Armstrong et al. |
| 2002/0169771 A1 | 11/2002 | Melmon |
| 2002/0170565 A1 | 11/2002 | Walker |
| 2002/0173875 A1 | 11/2002 | Wallace |
| 2002/0173971 A1 | 11/2002 | Stirpe |
| 2002/0173987 A1 | 11/2002 | Dang |
| 2002/0173988 A1 | 11/2002 | Dang |
| 2002/0173989 A1 | 11/2002 | Dang |
| 2002/0173992 A1 | 11/2002 | Dang |
| 2002/0174005 A1 | 11/2002 | Chappel |
| 2002/0178161 A1 | 11/2002 | Brezin et al. |
| 2002/0183626 A1 | 12/2002 | Nordstrom |
| 2002/0187772 A1 | 12/2002 | Hyyppa |
| 2002/0188452 A1 | 12/2002 | Howes |

| | | | |
|---|---|---|---|
| 2002/0193667 | A1 | 12/2002 | McNair |
| 2002/0194221 | A1 | 12/2002 | Strong |
| 2002/0195488 | A1 | 12/2002 | Walsh |
| 2002/0198885 | A1 | 12/2002 | Streepy |
| 2003/0009239 | A1 | 1/2003 | Lombardo |
| 2003/0009357 | A1 | 1/2003 | Pish |
| 2003/0009359 | A1 | 1/2003 | Weidner |
| 2003/0018595 | A1 | 1/2003 | Chen |
| 2003/0023473 | A1 | 1/2003 | Guyan |
| 2003/0027223 | A1 | 2/2003 | Muraca |
| 2003/0028404 | A1 | 2/2003 | Herron |
| 2003/0032069 | A1 | 2/2003 | Muraca |
| 2003/0032871 | A1 | 2/2003 | Selker |
| 2003/0033169 | A1 | 2/2003 | Dew |
| 2003/0036924 | A1 | 2/2003 | Rosen |
| 2003/0049701 | A1 | 3/2003 | Muraca |
| 2003/0050804 | A1 | 3/2003 | Hendershot |
| 2003/0050825 | A1 | 3/2003 | Gallivan |
| 2003/0055531 | A1 | 3/2003 | Liff |
| 2003/0055679 | A1 | 3/2003 | Soll |
| 2003/0059750 | A1 | 3/2003 | Bindler et al. |
| 2003/0060688 | A1 | 3/2003 | Ciarniello |
| 2003/0061096 | A1 | 3/2003 | Gallivan |
| 2003/0069756 | A1 | 4/2003 | Higginbotham |
| 2003/0069760 | A1 | 4/2003 | Gelber |
| 2003/0074218 | A1 | 4/2003 | Liff et al. |
| 2003/0074226 | A1 | 4/2003 | Rostron |
| 2003/0074228 | A1 | 4/2003 | Walsh |
| 2003/0078813 | A1 | 4/2003 | Haskell et al. |
| 2003/0083903 | A1 | 5/2003 | Myers |
| 2003/0101089 | A1 | 5/2003 | Chappel et al. |
| 2003/0120632 | A1 | 6/2003 | Casey et al. |
| 2003/0130991 | A1 | 7/2003 | Reijerse et al. |
| 2003/0149594 | A1 | 8/2003 | Beazley et al. |
| 2003/0167184 | A1 | 9/2003 | Kole |
| 2003/0191667 | A1 | 10/2003 | Fitzgerald et al. |
| 2003/0208379 | A1 | 11/2003 | Haskey et al. |
| 2004/0006495 | A1 | 1/2004 | Dudley |
| 2004/0073811 | A1 | 4/2004 | Sanin |
| 2004/0078247 | A1 | 4/2004 | Rowe et al. |
| 2004/0122709 | A1 | 6/2004 | Avinash et al. |
| 2005/0102169 | A1 | 5/2005 | Wilson |
| 2005/0137912 | A1 | 6/2005 | Rao et al. |
| 2007/0168181 | A1 | 7/2007 | Ejerhed et al. |

FOREIGN PATENT DOCUMENTS

| | | |
|---|---|---|
| JP | 2000-250888 | 9/2000 |
| JP | 2001-022729 | 1/2001 |

OTHER PUBLICATIONS

Nashwan Dawood, "Estimating project and activity duration: a risk management approach using network analysis", Construction Management and Economics, 1998, pp. 41-48.
Randal B. Lorance et al., "Techniques for Developing Cost Risk Analysis Models", AACE International Transactions, 1999, 6 pages.
David P. Gluch et al., "A Collaboration in Implementing Team Risk Management", SEI Team Risk Management Project, Mar. 1996, 54 pages.
Ronald P. Higuera, "Team Risk Management: A New Model for Customer-Supplier Relationships", Software Engineering Institute, Carnegie Mellon University, Pittsburgh, Pennsylvania, Jul. 1994, 30 pages.
Digital Business Office Architecture; 2001 The Technical Resource Connection, Inc.; 1 Page.
Tips for Clean Claims for Institutional Providers; 3 Pages.
Health Claims for Equivalent Encounter Information; HCFA Uniform Bill-92 (UB-92), Version 4.1; 28 Pages.
New Area PPO Puts Emphasis on Claims Service; Alan Moorse; Capital District Business Review; 2 Pages.
Object Oriented Programming; A Guide for the Beginner- from Modula-2 to Java; 9 Pages.
Rules Based Systems Fuzzy Logic Expert Systems Forwards and Backwards Chaining Pattern Matching Imperative and Declarative Programming; Gaurav Sharma et al.; 13 Pages.
AMR Health's—AVS Reimbursement System; 3 Pages.
Introduction; 2 Pages.
Designing an Expert System; 1 Page.
Expert System Architecture; 2 Pages.
Choosing a Problem; 1 Page.
Knowledge Engineering; 1 Page.
Exam-like Questions; 1 Page.
Rules and Expert Systems; 1 Page.
A Simple Example; 2 Pages.
Explanation Facilities; 2 Pages.
More Complex Systems; 1 Page.
An Expert System Shell in Prolog; 4 Pages.
MYCIN: A Quick Case Study; 3 Pages.
Knowledge-Based System; 1 Page.
Expert System; 1 Page.
Inference Engine; 1 Page.
Inference Rule; 1 Page.
Object Code; 1 Page.
Rule-Based Systems; 1 Page.
Forward Chaining Systems; 3 Pages.
Backward Chaining Systems; 2 Pages.
Forwards vs. Backwards Reasoning; 1 Page.
Uncertainty in Rules; 1 Page.
Juan C. Nogueira et al., "A Formal Risk Assessment Model for Software Evolution", US Army Research Office under grant #38690-MA & grant #40473-MA.
Michael K. Daskalantonakis, "A Practical View of Software Measurement and Implementation Experiences Within Motorola", IEEE Transactions on Software Engineering, vol. 18, No. 11 Nov. 1992, pp. 998-1010.
Edward F. Weller, "Using Metrics to Manage Software Projects", IEEE, Sep. 1994, pp. 27-33.
Dick B. Simmons et al., "Software Measurement: A Visualization Toolkit for Project Control and Process Improvement", Prentice Hall, Nov. 1997, ISBN-0-13-840695-2.
"Caliber—Requirements Management (RM)", Http://web.archive.org/web/20000304023307/www.tbi.com/caliberrm/index.html.
H.P. Schultz, "Software Management Metrics", Mitre Corp. Report No. M88-1, May 1988 (abstract).
Karl E. Wiegers,"Automating Requirements Management", Process Impact, 1999, pp. 1-6.
Bruce Abbott, "Requirements Set the Mark", Info World, Mar. 5, 2001, pp. 45-46.
Andy Feibus, "Manage Your Project's Requirements", Information Week, Oct. 19, 1998, pp. 100-108.
QSS Delivers Industry's First Enterprise-Wide Requirements Management Suite for E-Business, QSS News Archive, Mar. 22, 2000.
D. W. Cordes, "Evaluation Method for User Requirements Documents", Information and Software Technology, May 1989, vol. 31, issue 4, pp. 181 (8 pages) (abstract).
J. Gyorkos, "Measurements in Software Requirements Specification Process", Microprocessing and Microprogramming, Dec. 1994, vol. 40, issue 10-12, p. 893 (4 pages) (abstract).
Rita Jean Costello, "Metrics for Requirements Engineering", California State University, 1994, 211 pages (abstract).
Jeanne Minahan Robinson, "Risk Assessment in Software Requirements Engineering: an Event Driven Framework", George Mason University, 1995, 177 pages (abstract).
U.S. Appl. No. 10/336,104, Chappel.
U.S. Appl. No. 10/690,257, Chappel.
U.S. Appl. No. 09/916,088, Creel et al.
Donald M. York, "An Early Indicator to Predict Requirements Volatility", George Mason University, 2001, 235 pages (abstract).
D. Pfahl et al., "Using Simulation to Analyze the Impact of Software Requirement Volatility on Project Performance", Information and Software Technology, Nov. 15, 2000, vol. 42, issue 14, p. 1001.
Capers Jones, "Strategies for Managing Requirements Creep", Software Productivity Research, Jun. 1996, pp. 92-94.

Adam A. Porter et al., "Empirically Guided Software Development Using Metric-Based Classification Trees", IEEE Software, Mar. 1990, pp. 46-54.

Max Lupul, "Forecast Pro for Windows, Version 1.1: What Does it Do?", Journal of Services Marketing, vol. 7, No. 4, 1993, pp. 67-69.

Geoffrey Hollander, "Forecast Pro Preasges Data", Infoworld, Feb. 21, 2000, vol. 22, No. 8, pp. 59-60.

John T. Mentzner et al., "Evaluating a Decision Support Forecasting System", Industrial Marketing Management, vol. 18, 1989, pp. 313-323.

Marco Carrer et al., "An Annotation Engine for Supporting Video Database Population", Multimedia Tools and Applications 5, Kluwer Academic Publishers, 1997, pp. 233-258.

Robert Gaizauskas et al., "Information Extraction: Beyond Document Retrieval", Computational Linguistics and Chinese Language Processing, vol. 3, No. 2, Aug. 1998, pp. 17-60.

Gian P. Zarri, "NKRL, a Knowledge Representation Language for Narrative Natural Language Processing", 1996, pp. 1032-1035.

"FastEMC 6.2: UB92 Electronic Claim Submission System", fPTechnologies, Oct. 31, 1999, manual.

R. Shaker et al., "A Rule Driven Bi-Directional Translation System for Remapping Queries and Result Sets Between a Mediated Schema and Heterogeneous Data Sources", pp. 1-5.

Daniel T. Heinze et al., "LifeCode—A Deployed Application for Automated Medical Coding", AI Magazine, Summer 2001, pp. 1-12.

Peter Jackson Benson, "A Field Study of Communication Patterns in an Organization Using the Negopy Computerized Network Analysis Technique", AAT 8728711, 1987, 223 pages (abstract).

Mark Ackerman et al., "Social Activity Indicators: Interface Components for CSCW Systems", Nov. 14-17, 1995, pp. 159-168.

"Chapter Four: Managing Core Competencies of the Corporation", Tactic #17, Organizational Network Mapping, The Advisory Board Company, 1996, pp. 393-410.

Valdis Krebs, "Organizational Network Analysis", Feb. 2001, Orgnet.com.

Economist.com, "The Big Picture", Jan. 4, 2001, Geneva.

Rainer Puittinen et al., "Measuring and Visualizing Information Transfer in Networked Collaboration", International Journal of Communication Systems, 1999, vol. 12, No. 85, pp. 85-101.

Eero Byckling et al., "Spin-offs from CERN and the Case of TuoviWDM", Technovation, 2000, vol. 20, No. 2, pp. 71-80.

Eero Eloranta et al., "Improved Project Management Through Improved Document Management", Computers in Industry, 2001, vol. 45, pp. 231-243.

Marc A. Smith et al., "Visualization Components for Persistent Conversations", CHI Mar.-Apr. 2001, vol. 3, No. 1, pp. 136-143.

Mikko Vuoikoski, "Making Intercorporate Project Communications Work Solutions for the International Market Place", Single Source OY, pp. 1-13.

Ari-Pekka Hameri, "Project Management in a long-term and Global One-of-a-Kind Project", International Journal of Project Management, 1997, vol. 15, No. 3, pp. 151-157.

Mokhtar Amami et al., "Project Management and Communication of Product Development Through Electronic Document Management", Project Management Journal, Jun. 2000, vol. 31, No. 2, pp. 6-19.

David Krackhardt, "Social Networks and the Liability of Newness for Managers", Journal of Organizational Behavior, vol. 3, 1996, pp. 159-173.

Mark D. Morelli et al., "Predicting Technical Communication in Product Development Organizations", IEEE Transactions of Engineering Management, vol. 42, No. 3, Aug. 1995, pp. 215-222.

Ralph Katz et al., "Communication Patterns, Project Performance, and Task Characteristics: An Empirical Evaluation and Integration in an R&D Setting", Organizational Behavior and Human Performance, Apr. 1979, vol. 23, iss. 2, p. 139 (abstract).

David Krackhardt et al., "Informal Networks: The Company Behind the Chart", Harvard Business Review, Jul. 1993, vol. 74, iss. 4, p. 104 (abstract).

Stanley Wasserman et al., "Social Network Analysis: Methods and Applications", Cambridge University Press, 1994.

James Gregory Jones, "A Study of Communications Between Subject Matter Experts and Individual Students in Electronic Mail Contexts", Dissertation, University of Texas at Austin, May 2001.

Mehul A. Shah, "ReferralWeb: A Resource Location System Guided by Personal Relations", Massachusetts Institute of Technology, May 1997.

Dick B. Simmons, "Manager Associate", IEEE, Transactions on Knowledge and Data Engineering, vol. 5, No. 3, Jun. 1993, pp. 426-438.

Dick B. Simmons, "A Win-Win Metric Based Software Management Approach", IEEE Transactions on Engineering Management, vol. 39, No. 1 Feb. 1992, pp. 32-41.

Dick B. Simmons, "Communications: A Software Group Productivity Dominator", Software Engineering Journal, Nov. 1991, pp. 454-462.

Ari-Pekka Hameri et al., "Distributed New Product Development Project Based on Internet and World-Wide Web: A Case Study", Product Innovation Management, 1997, vol. 14, pp. 77-87.

Laura Garton et al., "Studying On-Line Social Networks", Chapter Four of "Doing Internet Research", Steven Jones Editor, Sage Publications, 1999, pp. 75-105.

Ali A. Shah et al., "The Production of Accurate Construction Cost Estimates in Saudi Arabia", Cost Engineering, Aug. 1992, vol. 34, No. 8, pp. 15-24.

Spyros Makridakis, "Accuracy Measures: Theoretical and Practical Concerns", International Journal of Forecasting, vol. 9, No. 4, Dec. 1993, p. 527-529.

Raymond A. Paul et al., "Software Metrics Knowledge and Databases for Projected Management", IEEE Transactions on Knowledge and Data Engineering, vol. 11, No. 1, Jan./Feb. 1999, pp. 255-264.

Ching-Seh Wu, "Software Project Plan Tracking Intelligent Agent", Dissertation, Texas A&M University, Dec. 2000.

Mario Alberto Garcia Espinosa, "Intelligent Agents Applied to Software Management", Texas A&M University, Dissertation, Aug. 1997.

Rational RequistiePro: Product Overview, Rational.com, retrieved from Archive.org.

Forecast Pro Product Brochure: Fast, Easy, Accurate Forecasting, Business Forecast Systems, 2000, pp. 1-12.

G. Libert, "The M-Competition With a Fully Automatic Box-Jenkins Procedure", Journal of Forecasting, Jul.-Sep. 1984, vol. 3, No. 3, pp. 325-328.

Pamela Texter, "Automatic Forecasting of Multivariate Time Series", Pennsylvania University, 1986, AAT 8705423, abstract only.

M. Hashem Pesaran et al., "A Generalized R Squared Criterion for Regression Models Estimated by the Instrumental Variables Method", Econometrica, vol. 62, No. 3, May 1994, abstract only.

Leonard Tashman et al., "Automatic Forecasting Software: A Survey and Evaluation", International Journal of Forecasting, 1991, vol. 7 No. 2, abstract.

Nagata Yasushi et al., "Comparison of Determination Coefficient Estimators in the Linear Regression Analysis", Hinshitsu, vol. 27, No. 2, 1997, abstract only.

Elvezio Ronchetti, "Regression and Time Series Model Selection", Journal of the American Statistical Association, Sep. 2000, vol. 95, No. 451, pp. 1008-1009.

Chris Chatfield, "Time-Series Forecasting", Chapman & Hall/CRC, Oct. 25, 2000, ISBN: 1584880635.

Allan D. R. McQuarrie et al., "Regression and Time Series Model Selection", World Scientific, Aug. 1998, ISBN: 981023242X.

Beiyao Zheng, "Summarizing the Goodness of Fit of Generalized Linear Models for Longitudinal Data", Journal of Statistics in Medicine, vol. 19, No. 10, 2000, abstract only.

Rational RequisitePro—User's Guide Version 4.5, Rational, 1999.

Khairy A.H. Kobbacy et al., "Towards the Development of an Intelligent Inventory Management System", ProQuest, vol. 10, No. 6, 1999, 11 pages.

Walter Reitman et al., "Artificial Intelligence Applications for Business", Ablex Publishing Corporation, Jan. 1984, pp. 114-118, 135-137.

Evelina Lamma et al., "AI*IA 99: Advances in Artificial Intelligence", Sep. 1999, pp. 25-34, 36.

Jae K. Shim, "The Complete Guide to Forecasting Real World Company Performance: Strategic Business Forecasting", CRC Press, 2000, pp. 131-139, 141-145, 147-158, 267.

Derek Partridge et al., "Artificial Intelligence: Business Management", Ablex Publishing Corporation, 1992, pp. 154-158, 185-188, 197-198, 279, 282-285, 298.

K. S. Leung et al., "Fuzzy Concepts in Expert Systems", IEEE, vol. 21, No. 9, Sep. 1988, pp. 43-56.

H. C. Harrison et al., "An Intelligent Business Forecasting System", Proceedings of the 1993 ACM Conference on Computer Science, 1993, pp. 229-236.

"Autobox 5.0 For Windows: User's Guide & Reference Guide", Dec. 10, 1999, pp. 1-65.

"Smart Software: Enterprise Forecasting Solutions", May 2000-Jul. 2001, pp. 1-36.

Bryan Marvin, "Predicting the Future Proves Easy with Forecast Pro Planner (Software Review)", PC Week, vol. 4, No. 35, Sep. 1, 1987.

Makridakis, Spyros et al., Forecasting Methods and Applications Third Edition, John Wiley & Sons, 1998, ISBN: 0-471-53233-9.

Turban, Efraim et al., Decision Support Systems and Intelligent Systems—Fifth Edition, Prentice Hall, Inc., 1998, ISBN: 0-13-740937-0.

Bell et al., The Forecasting Report, Sep. 1999.

Armstrong, Scott J., Strategic Planning and Forecasting Fundamentals, 1983, Excerpt from Albert, Kenneth, The Strategiic Management Handbook, McGraw Hill.

Armstrong, J. Scott et al., Principles of Forecasting—A Handbook for Researchers and Practitioners, Springer, Apr. 2001, ISBN: 0792374010.

Armstrong, J. Scott et al., Principles of Forecasting—Web Site, Jan. 2001, www.passig.com/pic/ForecastingHandbook.htm.

ForecastPro.com—Home, Product Description and Product Review web pages, Nov. 2000, Retrieved Apr. 15, 2005 from Archive.org.

Hollandeer, Geoffrey, ForecastPro Presages Data, InfoWorld, Feb. 2000.

Stellwagen, Eric, New Version of Forecast Pro Greatly Expand Capabilities, Performance and East of Use, Business Forecast Systems, Inc., Press Release, Feb. 2000.

Coffee, Peter, Forecast Pro XE Sharpens Users' View, PC Week Labs, Feb. 2000.

Armstrong, Scott J. et al., Forecasting for Marketing, Excerpt from Hooley et al., Quantitative Methods in Marketing, Second Ed, 1999, pp. 92-119.

Delurgio, Steve, Guide to Forecast Pro from Windows, Retrieved from forecast.umkc.edu, Apr. 2005.

Forecast Pro Product Brochure, Retrieved Apr. 19, 2005 from Archive.org—www.forecastpro.com.

Jain, Chaman, Benchmarking Forecasting Software Packages and Systems, Institute of Business Forecasting Research Report 32, Retrieved Apr. 19, 2005 from Archive.org—www.forecastpro.com.

Sosa, Manuel E. et al., Understanding the Effects of Product Architecture on Technical Communication in Product Development Organizations, Massachusetts Institute of Technology, Sloan School of Management Working Paper, Aug. 2000 (pp. 1-34).

Allen, Thomas, "Architecture and Communication Among Product Development Engineers", Proceedings of the IEEE Management Society, 2000 (pp. 153-158).

Collopy, Fred, "Rule -Based Forecasting: Development and Validation of an Expert Systems Approach to Combining Time Series Extrapolations, Management Science", vol. 38, No. 10, 1992, pp. 1394-1414.

Rust, Roland T. et al., "Model Selection Criteria: An Investigation of Relative Accuracy, Posterior Probabilities, and Combinations of Criteria, Management Science", vol. 41. No. 2, Feb. 1995, pp. 322-333.

Hill, G.W. et al., "Automatic Box-Jenkins Forecasting", The Journal of the Operational Research Society, vol. 31, No. 5, May 1980, pp. 413-422.

Park, Kwan Hee, "Development and evaluation of a prototype expert system for forecasting models", Mississippi State University, 1990, AAT 9109003, Abstract.

Al-Jabri, Ibrahim Muhammad, "Expert system for forecasting", Illinois Institute of Technology, 1991, AAT 9222168, Abstract.

Wang, Liang, et al., "An Expert System for Forecasting Model Selection,", First IEEE Conference on Control Applications, Sep. 13-16, 1992, pp. 704-709.

McCord, Kent R. et al., "Managing the Integration Problem in Concurrent Engineering", MIT Sloan School of Management, Aug. 1993, pp. 1-34.

Thomas, Stephen Richard, "An Assessment Tool for Improving Project Team Communications", Dissertation, University of Texas at Austin, Dec. 1996, 80 pages.

EIC NPL finding, date unknown.

EIC Best Hits finding, date unknown.

EIC Patent finding, date unknown.

* cited by examiner

METHOD OF AND SYSTEM FOR POPULATING KNOWLEDGE BASES USING RULE BASED SYSTEMS AND OBJECT-ORIENTED SOFTWARE

CROSS-REFERENCE TO RELATED APPLICATIONS

This patent application is a continuation-in-part of, and incorporates by reference the entire disclosure of, co-pending U.S. patent application Ser. No. 10/336,104, which was filed on Jan. 3, 2003. U.S. patent application Ser. No. 10/336,104 is a continuation-in-part of U.S. patent application Ser. No. 09/859,320, which was filed on May 16, 2001 now U.S. Pat. No. 7,236,940. This patent application incorporates by reference the entire disclosure of U.S. patent application Ser. No. 09/859,320. This patent application also incorporates by reference the entire disclosure of a U.S. patent application entitled "Method of and System for Rules-Based Population of a Knowledge Base Used for Medical Claims Processing," filed on the same date as this patent application Ser. No. 10/690,257.

BACKGROUND OF THE INVENTION

1. Technical Field of the Invention

The present invention is generally related to medical claims processing, and more specifically, but not by way of limitation, to a method of and system for rules-based population of knowledge bases using object-oriented software.

2. Description of Related Art

The healthcare industry has become very large from the standpoint of financial transactions. Healthcare providers ("providers"), such as hospitals, physicians, and ancillary services (e.g., laboratories, pharmacies), have expanded treatment and services as medicine has become more diverse in treating people for many more ailments than in the past. One reason for the expanded treatment and services includes advancements in research and development of technology to aid physicians in diagnosing and treating patients.

Accordingly, the healthcare insurance industry has grown to assist patients in paying for healthcare expenses. In providing for payment of services, healthcare insurance companies and other payment organizations (e.g., Medicare, Medicaid, etc.) ("payers") have established medical services and procedures to be covered for the treatment of patients. The providers and other organizations (e.g., industry standards groups and government regulators) have developed a variety of protocols to submit payment requests or medical insurance claims ("claims") to the payers for payment or co-payment of treatment and services rendered by the providers.

The protocols that have been developed by the payers and other organizations were developed in an effort to form standards by which payers recognize treatment procedures and services performed. The protocols enable the payers to more easily determine if the treatment procedures and services are covered by the insurance policies of the patients. As the industry developed, a number of different protocols developed in the way of claim forms, including UB-92 (formerly UB-82), which is utilized by institutional providers (e.g., hospitals), and HCFA 1500, which is utilized by professional providers (e.g., physicians). The claim forms traditionally were in the form of paper. However, the claim forms have evolved with technology and are now able to be filled out on a computer in an electronic format. While most providers utilize computers to fill out the electronic claim forms, small and rural providers continue to utilize paper claim forms.

Whether the provider utilizes paper or electronic claim forms, codes that identify medical diagnosis and treatment that have been generated by healthcare industry standards groups (e.g., National Uniform Billing Committee (NUBC), State Uniform Billing Committee (SUBC), government regulators, payers, etc.), are used in filling out claim forms for submission to payers. By utilizing standardized codes, providers and payers may communicate in a uniform manner. There are approximately 20 code sets today that have been developed for providers to utilize based on the specific field of medicine, service, treatment, etc., that is provided to the patient. For example, the International Classification of Disease 9th revision codes, generally known as ICD-9 codes, are utilized to describe diagnoses and the treatment of medical conditions afflicting various body parts (e.g., head, arms, legs, etc.). Other types of codes include Common Procedure Terminology (CPT4) codes, which are used for physician codes; Diagnosis Related Group (DRG), which are used for in-patient procedures; and Healthcare Procedure Coding Systems (HCPCS), which are used for drugs, durable medical equipment and outpatient services. As understood in the art, the codes generally are updated annually and new types of codes are created as medical procedures and specialties are formed.

While the code sets have been established to enable the healthcare and insurance industries to use common codes, there are many reasons why a medical procedure or service may not always be easily classified with a particular code. A provider may perform a procedure and write or dictate a treatment analysis to be submitted for insurance reimbursement. A claim coder (i.e., individual who interprets the treatment analysis and assigns the proper code into the claim form) may interpret the treatment analysis differently from a different claim coder. And, based on the correctness of, and compliance to, claim submission rules of the claim codes submitted, the payer may or may not approve of the procedure or treatment for reimbursement.

Figure 1A:
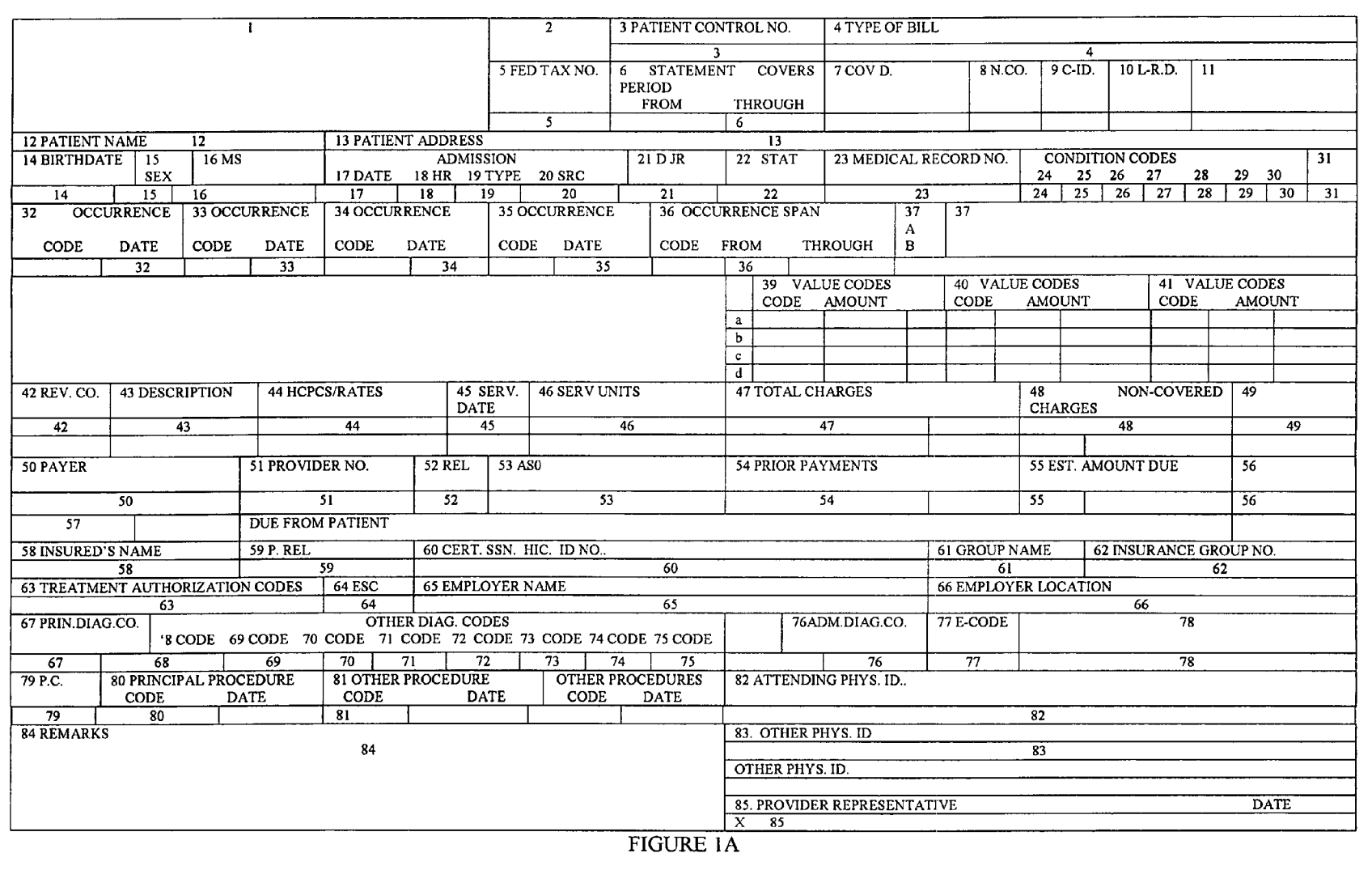
Figure 1B:
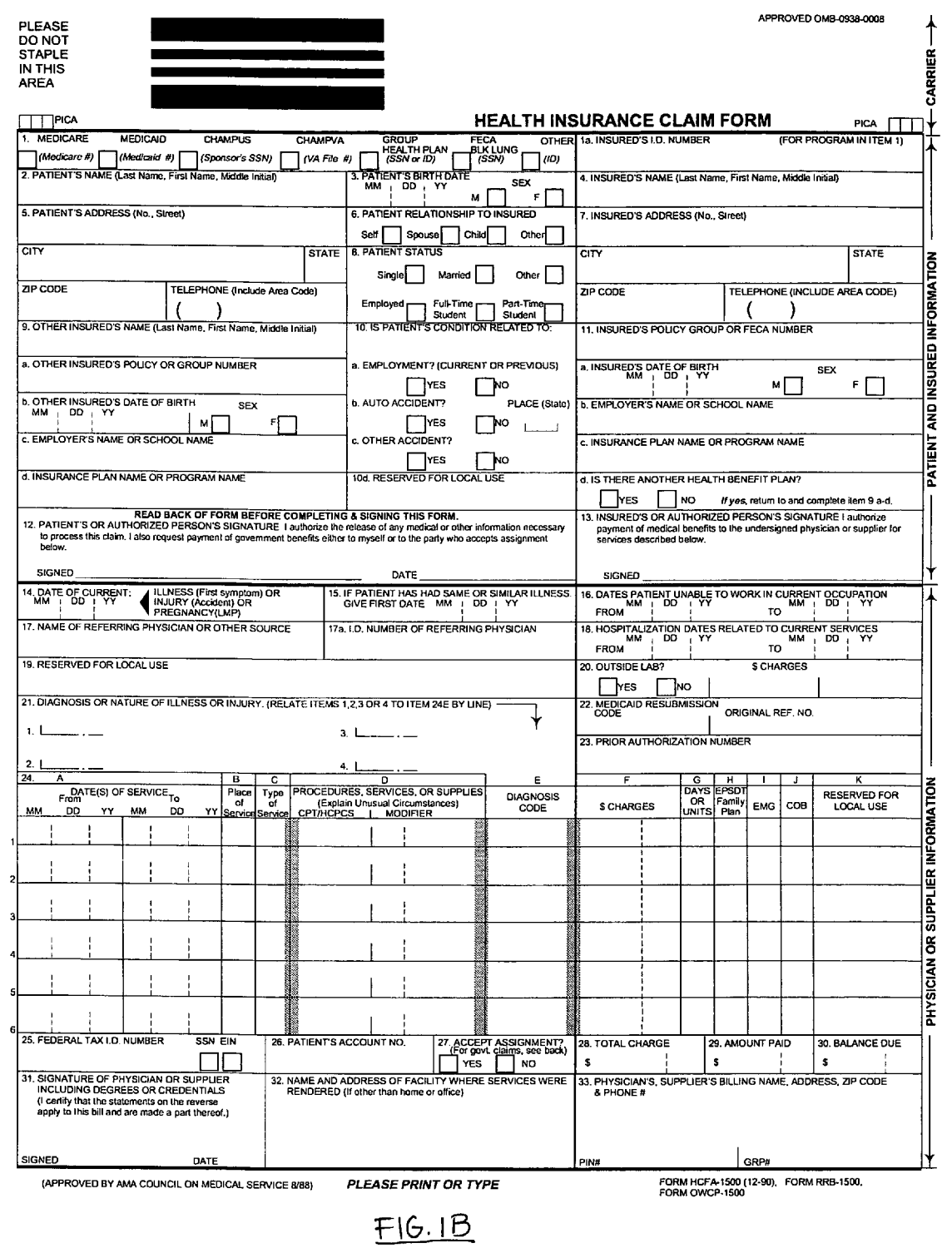

FIG. 1A is a diagram of a sample UB-92 claim form. The claim form includes 85 identified fields for entry of information and/or codes. Various information may be entered into the associated fields. For example, field 1 is used for entry of the provider name, address, and telephone number, as required. Field 3 is used for entry of the patient control number, which is the account number for the patient. As indicated, no special characters (e.g., *, @, -, #, etc.) are allowed. Field 4 indicates the type of bill and is a three-digit code, where the first digit indicates type of provider (e.g., hospital, skilled nursing, home health, etc.), the second digit indicates the type of care (e.g., inpatient, outpatient, specialized services, etc.), and the third digit indicates the type of claim (e.g., non-payment/zero claim, admit through discharge claim, interim-$1^{st}$ claim, etc.). Fields 67-81 are used to enter ICD-9 codes for diagnosis and procedure identification. As indicated, determining the proper codes to insert is often complex and difficult, especially codes relating to the diagnosis and procedure information of the ICD-9 codes. In fact, comprehensive educational courses are provided to medical assistants to teach how the forms are to be properly filled out.

FIG. 1B is a diagram of an exemplary Health Care Financing Administration (HCFA) 1500 form. Similarly to the UB 92, the HCFA 1500 includes 33 fields for entering various information that is, in many instances, the same as, or similar to, information entered on the UB-92. For example, fields 2, 3, and 5 of the HCFA 1500 relate to the patient's name, birth date, and address respectively. The UB-92 also includes this information at fields 12-14. The HCFA 1500 also requires the entry of diagnosis and procedural codes at fields 24B-24E. The HCFA 1500 can be quite difficult and time-consuming to fill out.

Entry of the UB-92 and HCFA 1500 claim forms may be a challenging task due to the complexity of information necessary and because both the medical codes and insurance information must be determined and entered. While one may become an expert at entry of the claim form, because each payer has different rules for authorizing payment based on the information submitted on the claim form and each provider has different methods or procedures for determining the information to be entered into the claim form, the claim submission and reimbursement process often becomes a financial burden for both the provider and payer.

As well understood in the art, there are large numbers of providers and payers. While there are an estimated 300(+) major providers and payers, there are several thousands of physicians, all of whom submit claim forms to the thousands of payers. Because patients of a single provider may have insurance with many tens or hundreds of payers, the providers are overburdened and practically incapable of maintaining knowledge as to the rules and requirements, addressees, contacts, etc., for each payer. One quickly understands the magnitude of the coordination of communications needed between the providers and payers.

To assist both the provider and payer with the coordination of claim submission, an industry of clearinghouses has developed. FIG. 1C is a diagram that illustrates an exemplary business model of providers 102a-102d (collectively 102) for submitting claim forms 103 to payers 104a-104d (collectively 104) via clearinghouses 106a-106c (collectively 106). The claim form 103 may be submitted on paper or electronically via data packets 108 across a communication system (See FIG. 4). As can be seen in FIG. 1A, the number of communication links between the providers 102 and payers 104 is substantially reduced by the inclusion of the clearinghouses 106.

The clearinghouses 106 perform, at least in part, distribution duties similar to a postal distribution center for the providers of the claim forms 103 in either paper or electronic formats. The clearinghouses 106 perform, at least in part, communication of status (e.g., acceptance, rejection, etc.) of the submitted claims from the payers 104 to the providers 102. The process by which the claims are accepted or rejected by the payers 104 is generally known as the adjudication process.

FIG. 2 is a diagram that illustrates an exemplary process time line 200 describing general operations for processing a medical claim by the parties of FIG. 1C. The processing may include preparing, submitting, distributing, adjudicating, and remitting on the claim for the providers 102, clearinghouses 106, and payers 104. As understood in the art, the process starts at step 202 as the claim form 103 is filled out with patient information, such as name, address, phone number, religion, etc., at a pre-admit phase of a patient being admitted to see a provider. At step 204, an admission and eligibility phase is performed by the provider determining eligibility for services of a patient and admitting the patient to be treated. The process of admitting the patient may be determined based on, at least in part, the patient having valid insurance and/or credit. The admission/eligibility phase at step 204 may further include the process of provider 102 treating and/or diagnosing the patient. At step 206, the provider 102 discharges the patient. The provider 102 may thereupon update a patient chart for the patient with treatment and diagnosis information as understood in the art. The treatment and diagnosis information may be transposed onto the claim form 103 by determining the appropriate codes (e.g., ICD-9 codes) to enter into the correct field(s) (e.g., field 67) of the claim form 103 at step 208. Once the claim form 103 is completed and ready for submission to a payer 104, a "bill drop" or communication of the claim form 103 may be made from the provider 102 electronically or via mail at step 210. In general, the bill drop at step 210 is performed in a batch process to the clearinghouse 106 due to computer systems of the providers 102 and payers 104 not having direct communication as a result of the computer systems and software not having compatible architecture.

Some of the reasons for the computer systems of the providers 102 and payers 104 not having compatible architectures include: (1) the healthcare industry having traditionally performed paper processing transactions, (2) the computer and software systems of the providers 102 and payers 104 never having been developed to communicate with one another, (3) the codes developed for the providers 102 not necessarily having been adopted by the payers 104, (4) the clearinghouses 106 having been established to manage and process claims, thereby not having an incentive to adopt a direct, real-time payment system between the providers and payers, (5) the payers having limited incentive to expedite payment as delay in payment increases interest revenue for the payers, (6) the number of people, organizations and government entities defining codes adding layers of complexity to the process, and (7) technology not having been fully adopted by the healthcare industry. For example, there are very few direct connections between trading partners (i.e., specific provider 102 and payer 104).

Software developers and information technology companies that the providers 102 and payers 104 have utilized to develop systems and software to manage the claims processing have generally been devoted to either the provider 102 or payer 104, so that the concerns of the other side essentially have been unincorporated in the development process. In other words, the business model for the systems have focused on either the payer 104 or provider 102 side in terms of collecting revenue. On the provider side, the systems are established to conform to the needs of the general population of payers 104 (e.g., to form submission compliance with as many payers 104 as possible), which typically causes the systems to be less compatible with any specific payer 104. On the payer side, the systems are established to conform to the needs of the general population of providers 102 (e.g., to receive form submission from as many providers 102 as possible), which typically causes the systems to be less compatible with any specific provider 102.

While the incompatibility of the systems of the providers 102 and payers 104, and lack of desire and motivation of the clearinghouses 106 and payers 104 have held back progress in improving the technology for the healthcare industry to more efficiently and effectively process claims, the major problems that the industry has to overcome include, but are not limited to, the (i) dynamic environment of rapidly changing codes, (ii) conflicting reporting requirements, and (iii) contradictory payment guidance. These problems and turmoil have resulted in a complete industry being created to focus on interpreting the changes in codes and reporting guidance and creating software programs to evaluate the contents of the claim forms 103 and assess the validity of the claim forms 103 before being sent to the payer 104 for adjudication and settlement. This industry, which includes clearinghouses 106, receives change notifications and error reports in many different forms. In many cases, an originator of the change announces how the change should be handled by payers and fiscal intermediaries. These change handling instructions are referred to as "edits" as understood in the healthcare industry or various other industries.

Continuing with FIG. 2, the process of applying edits to submitted claim forms is performed at step 212. This process is performed by the clearinghouse 106 for each of the claims submitted in a batch, which may include large numbers (up to 500 or more) of claims. Edits may come in many forms, including being (i) tucked into the body of a government released transmittal, (ii) listed in a spreadsheet or table containing hundreds or thousands of edits that have been created by both providers 102 and payers 104, and (iii) contained in the text of specification documents. In many cases, edits are created by provider organizations in order to overcome a shortfall in a legacy accounting system that cannot be modified to accommodate new changes. Regardless of the source for the edits, the edits are almost always provided in free form English language text. Because the edit text is generated by different individuals, in different locations, at different times, often using different sentence structures, and because of the nature of the edit generation process, the task of analyzing, cataloging, and managing edits has become a time and labor-intensive activity. One example of the complexity of managing edits is a healthcare management company having 100 provider institutions located in ten different states submitting medical insurance claims to Medicare, ten different Medicaid payers, an undetermined number of commercial payers, and Civilian Health and Management Program Uniformed Service (CHAMPUS), which recently became Tricare, for providing medical insurance to military dependents and retired military personnel, thereby resulting in the healthcare management company having 10,000 or more edits to manage.

The term "edits" historically was used to describe the process of correcting information in a data file. While the edits still refer to correcting information, the term "edits" in the healthcare industry for insurance claims provides for a directive to correct information that is incorrect or does not comply with business rules established by a payer. In other words, the edits may be considered statements of situations that cause an error to occur to hinder payment or processing of final adjudication of a particular insurance claim. The business rules of payer 104, which may be established arbitrarily or based on the policies of the payer 104, for example, may be established and modified on an annual basis or more frequently. For example, one business rule may be as simple as requiring the last name to be entered with all capital letters. Another business rule may indicate that a certain procedure is to be denied reimbursement if a certain diagnosis not requiring the procedure to be performed is reached. Yet another business rule may require a certain identifier in a field if an intern assists in a medical procedure. And, if any of these business rules are violated, an edit is generated and applied to the insurance claim form 103 to notify the provider 102 that a correction is needed per the instructions of the edit.

An example of an edit includes the following: "Move UPIN from 82AA to 82BA," where UPIN is an abbreviation for universal provider identification number and AA and BA are field identifiers in the form locator referring to an attending physician on a UB-92 claim form 103. As understood in the art, the word "move" alternatively may be written as "copy," "change," include," or other synonym in an edit. The choice of words for an edit is arbitrary as there are no particular standard terms to be used for edits for the individuals who generate the edits. And, because of the multitude of different, yet related terms, the edits associated with the business rules may mean the same thing or be substantially semantically similar and unnecessarily increase the overall number of edits to which the providers must adhere.

The end goal for the providers 102 is to expedite final adjudication of medical claims by minimizing rejection of the medical claims by the payer 104 due to errors entered on the claim forms 103. To minimize the errors entered on the claims form 103, an understanding of the edits is desirable as the edits offer a roadmap for mistakes that may be made in view of the business rules and codes utilized to adequately and correctly complete the claim forms 103 for claim validation. Claim validation occurs when at least the following items are satisfied: (i) the claim form 103 is complete in the eyes of the payer 104, (ii) the data are properly formatted in the proper location on the claim form 103, and (iii) the data accurately reflects medical services provided and meets service constraints, which are generally embodied in the edits. However, because of the large volume of edits and frequency of edit modifications, creation of a complete understanding and knowledge base of the tens of thousands of edits is substantially impossible for an individual attempting to design a system to expedite medical claims processing.

After the process of applying edits to a claim form at step 212, if there are no edits applied to the claim form 103 because no errors were detected, then the claim form 103 is communicated to the payer 104 in a format that the payer 104 requires. Otherwise, if errors were detected on the submitted claim form 103, then the claim form 103 and associated edits 215 are communicated back to the provider 102 for correction to the claim form 103.

At step 216, the payer 104 receives the claim form 103. A receipt of receiving the claim form 103 may be communicated back to the provider 102 via the clearinghouse 106 for notification purposes. At step 218, the payer 104 adjudicates on approving the claim for payment purposes. The adjudication is based on rules or policies that the payer 104 may have for the health insurance plan of the patient. Generally, the edits include enough of the policies so that the claims are approved by the payer 104, but is not always the case.

At step 220, a status including the results of the adjudication process of step 218 may be communicated via the clearinghouse 106 back to the provider 102. If the claim was rejected, the provider 102 may be allowed to cure the defect. Additionally and/or alternatively, the provider 102 or patient may appeal the rejection at this stage without having to resubmit another or amended claim form 103. If the claim was approved, then payment 223 of the claim may be resubmitted to the provider 102, either directly or indirectly. At step 224, the provider 102 receives the payment 223 and applies it to collections at step 226. At this point, the claim is considered closed as payment by the payer 104 has been tendered.

SUMMARY OF THE INVENTION

A method of populating a knowledge base includes creating at least one claim element based on information related to at least one of a claim form and an updated specification, creating at least one rule from said information related to at least one of a claim form and an updated specification, applying said at least one rule to said at least one claim element to form knowledge, and populating the knowledge base with said knowledge acquired from said applying step.

An article of manufacture for populating a knowledge base used in validating medical claims includes at least one computer readable medium and processor instructions included on the at least one computer readable medium. The processor instructions are configured to be readable from the at least one computer readable medium by at least one processor and thereby cause the at least one processor to operate as to create at least one claim element based on information related to at least one of a claim form and an updated specification, create at least one rule from said information related to at least one of a claim form and an updated specification, apply said at least one rule to said at least one claim element to form knowledge, and populate the knowledge base with said knowledge acquired from said applying step.

A system for populating a knowledge base includes means for creating at least one claim element based on information related to at least one of a claim form and an updated specification, means for creating at least one rule from said information related to at least one of a claim form and an updated specification, means for applying said at least one rule to said at least one claim element to form knowledge, and means for populating the knowledge base with said knowledge acquired from said means for applying.

BRIEF DESCRIPTION OF THE DRAWINGS

A more complete understanding of the principles of the present invention may be obtained by reference to the following Detailed Description when taken in conjunction with the accompanying Drawings wherein:

FIG. 1A, previously described in part, is an exemplary UB-92 claim form used in a medical claim process;

FIG. 1B, previously described in part, is an exemplary HCFA 1500 claim form used in a medical claim process;

DETAILED DESCRIPTION OF EXEMPLARY EMBODIMENTS OF THE INVENTION

Figure 1C:
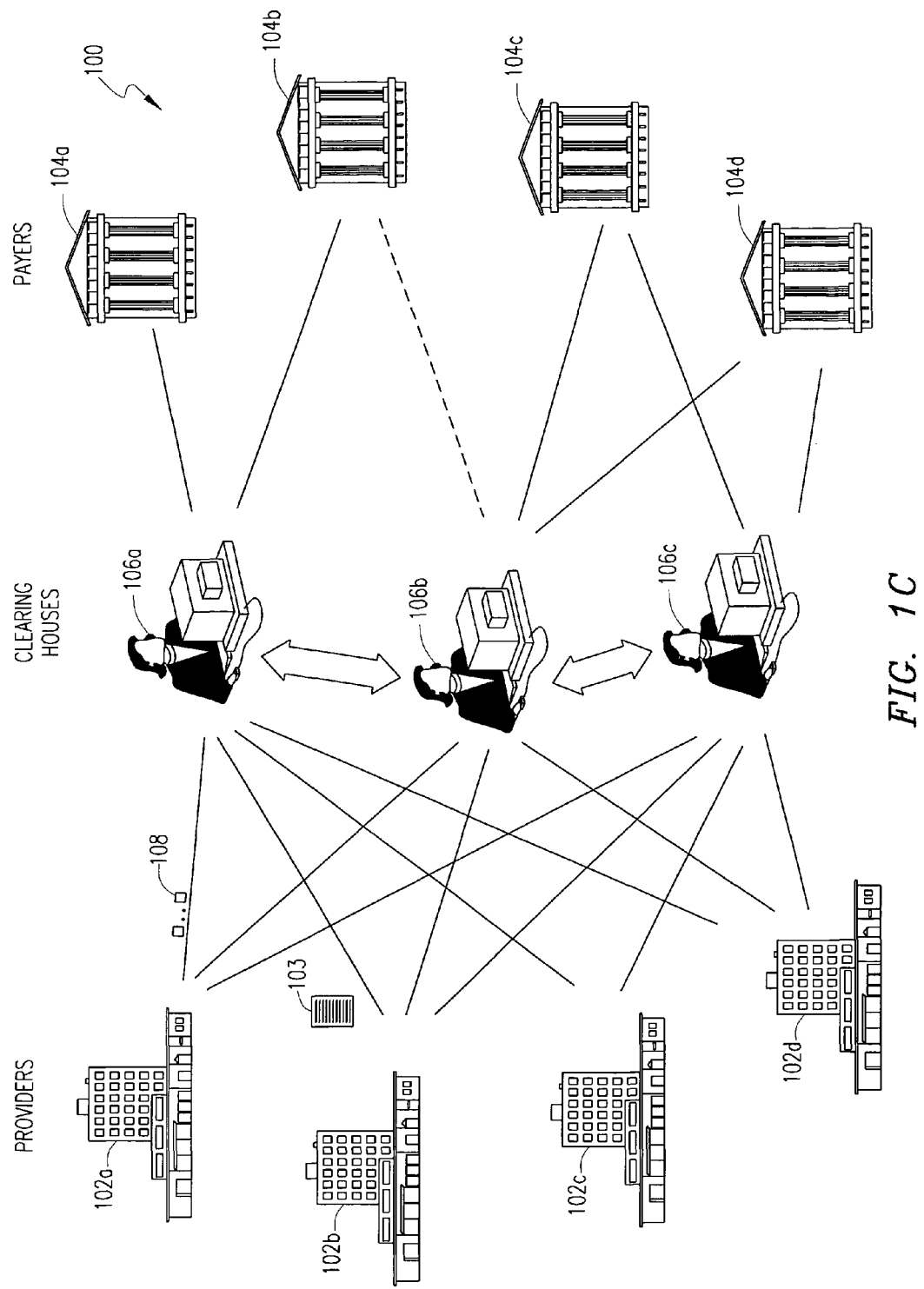
FIG. 1C, previously described in part, is a diagram that shows an exemplary business model of providers submitting claim forms to payers via clearinghouses as understood in the art.

Medical insurance claims processing has become a significantly complex, expensive, and time consuming part of the medical industry due to the vast number of treatment codes, rules, and edits (i.e., claim form change instructions written in English language form) that have been formed over the years by governmental entities, medical industry standards committees, medical providers 102, and payers 104. The frequency of changes of the treatment codes continues to cause additional edits to be generated to resolve claim form entries that do not conform to the rules or errors that the payers 104 reject as being non-conforming or impermissible due to the rules of the payer 104 for the medical procedure or treatment to be reimbursed. In submitting medical insurance claims, the providers 102 generally send the claim forms 103 in batch electronically or via mail to payers 104 via a clearinghouse 106 (See FIG. 2). The clearinghouse 106 processes the claim forms 103, either manually or automatically, and distributes the claim forms 103 to the designated payers 104. If the claim form 103 is properly filled out, then the payer 104 adjudicates whether or not to pay for the medical procedure. If the claim form 103 is not properly filled out, then one of thousands of edits may be applied to the claim form 103 by the clearinghouse 106 or payer 104 and returned to the provider 102 for correction. Each payer 104 may have different rules and each time the treatment codes are updated, new rules and edits are created, which makes the process of filling out the claim form 103 increasingly more difficult.

In improving the efficiency of applying the edits to the claim forms 103, the total number of edits are consolidated by performing a comparison between the words of each of the edits to determine the degree of similarity of the words and/or semantics of the edits being compared. In one embodiment, a token list composed of each word of an edit string is generated for each edit being compared. A comparison may be made between the token lists and a percentage or discrete value may be formed based on the number of matched words divided by the average number of words in the edits being compared to indicate the degree of semantic similarity between the two edits. A scale may utilize the discrete value and a symbolic description may be generated based on the discrete value to indicate the degree of similarity between the two edits. In one embodiment, the scale is a Likert scale, whereby ranges of values (e.g., between 0.0 and 1.00 percent) are utilized to categorize the degree of similarity with the symbolic description. The symbolic description may include text, such as "significant similarity," "high similarity," "moderate similarity," "marginal similarity," and "insignificant similarity." Alternatively, grades (e.g., "A," "B," "C," etc.) or values (e.g., 100, 95, 90, etc.) may be generated as the symbolic description.

A sorted list of edits may be generated based on the discrete value and/or symbolic description. In one embodiment, the sorted list may be sorted in descending order from most similar semantically to least similar. The edits that are most similar may be consolidated by using a rule that uses the symbolic description in consolidating or recommending consolidation of the edits. In consolidating the edits, a union of the token lists of the edits being consolidated may be formed to a single edit that describes the edits determined to have a "significant similarity," for example. In one embodiment, a predetermined threshold may be utilized. For example, edits having a similarity within ten percent may be considered significantly similar and be automatically consolidated. Alternatively and/or additionally, edits considered to have a "high similarity" and/or "moderate similarity" may be recommended to be manually inspected for the edit consolidation process. Edits that are determined to have "marginal similarity" and/or "insignificant similarity" may be treated as edits that are not combinable with other edits. For example, edits that are determined to be above a predetermined threshold of similarity, such as 69 percent, may be formed as separate edits. By consolidating the edits, a manageable number of edits may be produced to be applied to rejected claim forms 103 being submitted by the providers 102 for reimbursement by the payers 104. By applying a reduced number of edits to the rejected claim form 103, the efficiency of processing of the claim forms may be improved to minimize or eliminate the need to submit claim forms 103 as a batch process. Depending upon how the similarity is measured, the number of edits may be reduced from thousands to hundreds.

Figure 2:
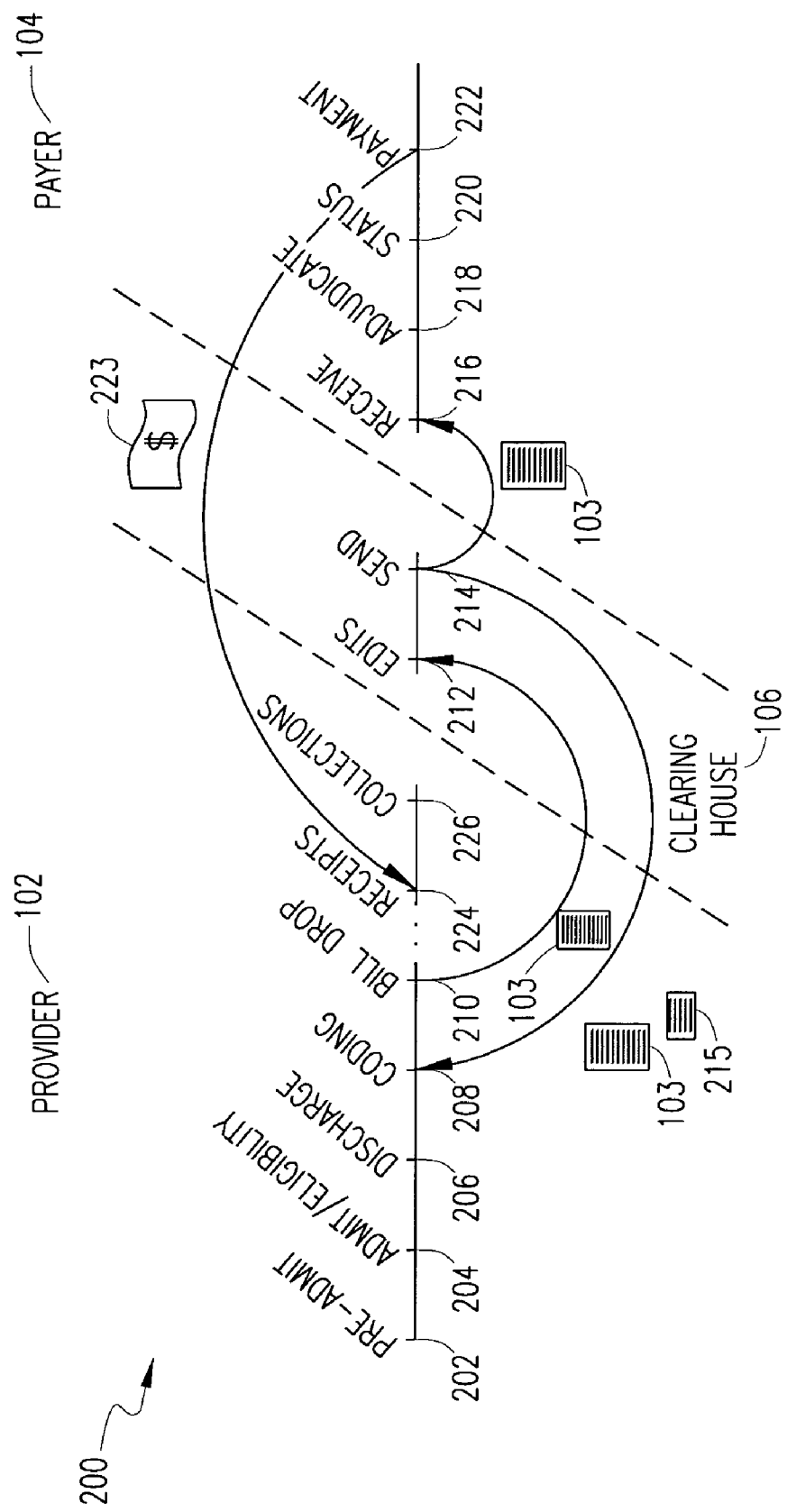
FIG. 2, previously described in part, is a diagram illustrating an exemplary process line describing general operations for processing a medical claim by the parties of FIG. 1C.
Figure 3:
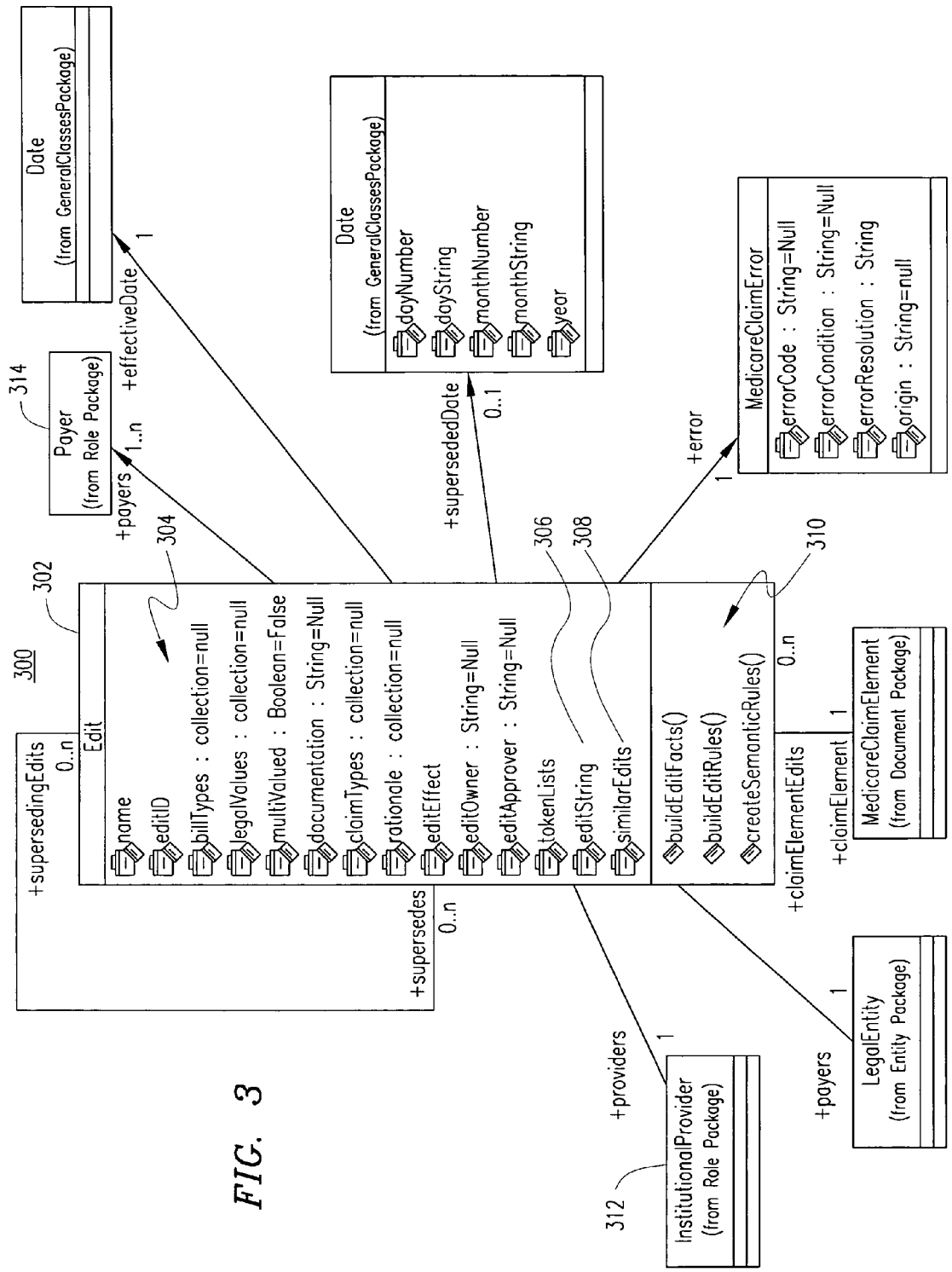
FIG. 3 illustrates an exemplary set of objects as understood in the art that may be utilized in consolidating edits for the medical claims submission process as shown in FIG. 2.

FIG. 3 is a diagram that illustrates an exemplary set of objects 300 as understood in the art that may be utilized in consolidating edits for the medical claims submission process 200 as shown in FIG. 2. An edit object 302 may include a number of data elements 304 to describe an edit and information associated with other elements. For example, "editString" 306 stores the English text description of the edit and the "similarEdits" 308 stores the edits or links to edits that are determined to be similar. Additionally, the edit object 302 may be associated with functional objects 310 used in the edit comparison process according to the principles of the present invention.

Other objects may be utilized to describe or model the entities associated with medical claims processing. For example, objects "InstitutionalProvider" 312 and "Payer" 314 may be utilized to describe particularities of different providers 102 and payers 104. In one embodiment, an instance of the payer object may include rules that a payer 104 has for adjudicating submitted claims and edits associated therewith based on the rules of the payer 104. Accordingly, by having objects that model the different entities (e.g., provider 102 and payer 104) with the claims filing process 200, more specific information for consolidating the edits may be generated. Additionally and/or alternatively, the entity objects 312 and 314 may be applied to a distributed network (see, for example, FIG. 4) and be utilized to process claim forms 103 being filed in real-time or otherwise.

Figure 4:
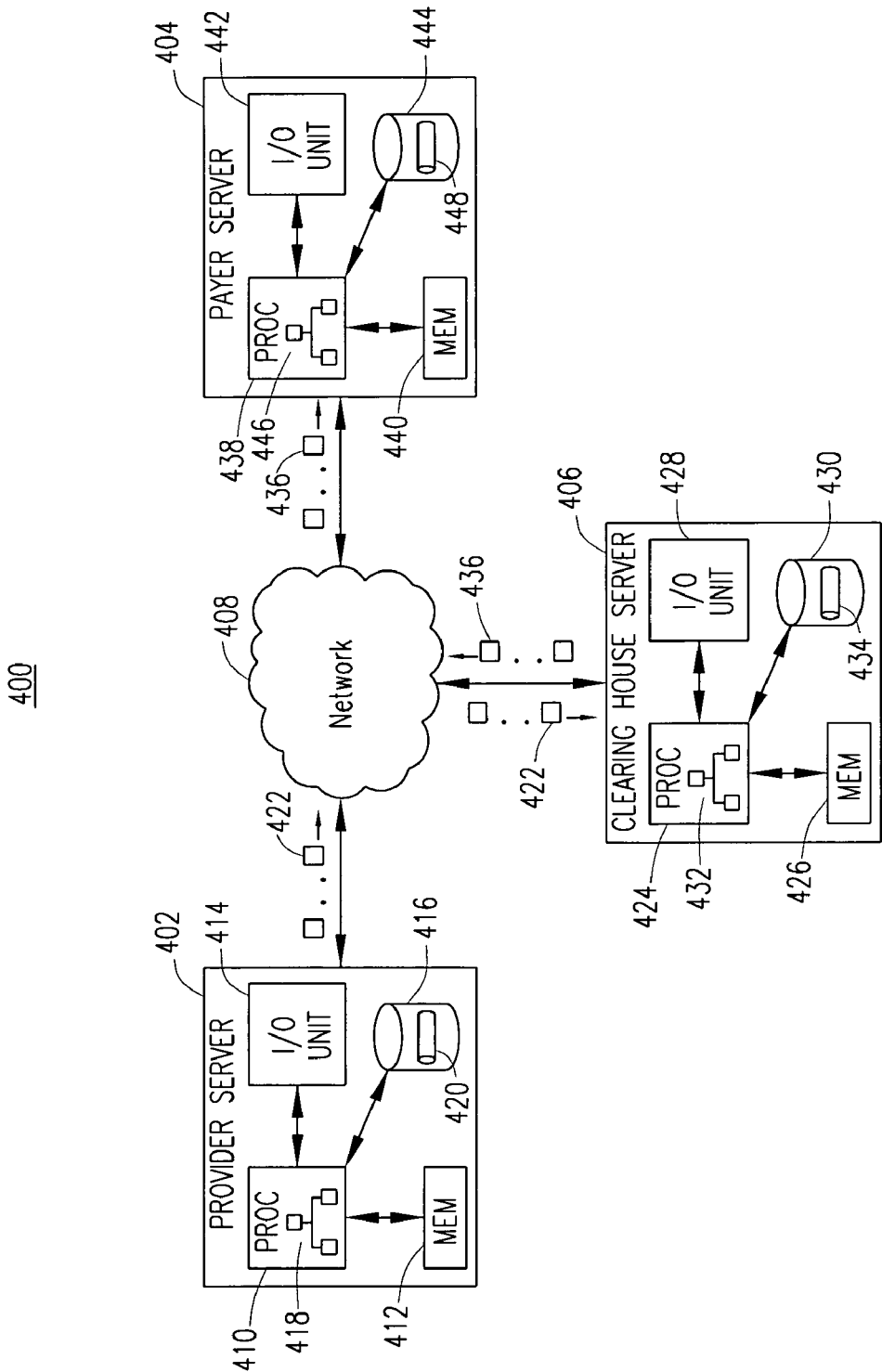
FIG. 4 is an exemplary block diagram of a distributed network operable to enable the entities of the medical industry of FIG. 1C to electronically perform medical insurance claim submission, processing, and adjudication.

FIG. 4 is an exemplary block diagram of a distributed network 400 operable to enable the entities of the medical industry of FIG. 1C to electronically perform medical insurance claim submission, processing, and adjudication. A provider server 402 may be utilized for entering information into a claim form 103 and electronically submitting the claim form 103 to a payer server 404 via a clearinghouse server 406 over a network 408 as understood in the art.

In another embodiment, the provider server 402 may submit the claim form 103 directly to the payer server 404 via the network 408. The network 408 may be the Internet, satellite network, wide area network (WAN), telecommunications network, or other communication system.

The provider server 402 may include a processor 410 coupled to a memory 412, input/output (I/O) unit 414, and storage unit 416. The processor 410 may operate software 418 for entry of patient information into the claim form 103. The software 418 may be object oriented such that the information is applied to elements of an object to be communicated over the network 408 for processing via the I/O unit 414. The memory 412 may store the software 418 prior and/or during execution. The storage unit 416 may store a database 420 that maintains the claim forms 103 in an object oriented or other format. The I/O unit 414 of the provider server 402 may communicate the claim form 103 using data packets 422 or other communication protocol as understood in the art.

The clearinghouse server 406 may operate to receive the claim form 103 via the network 408. In one embodiment, the clearinghouse server 406 receives claim forms 103 in a batch process. However, the principles of the present invention may provide for receiving claim forms 103 on an individual basis. The clearinghouse server 406 generally includes the same hardware as the provider server 402, including a processor 424 coupled to a memory 426, I/O unit 428, and storage unit 430. The processor 424 may execute software 432 that receives the information of the claim form 103. If the claim form 103 is represented as an object, then the software 432 may process the claim utilizing objects to verify the information of the claim form 103. In processing the claim, claim verification rules in the form of objects that specify how content is to be submitted on the claim form 103 in order to be adjudicated by one or more payers 104 may be utilized.

In one embodiment, the clearinghouse server 406 may apply the claim verification rules to the submitted claim form 103 and, in the case of an error (i.e., information entered into the claim form 103 not complying with the claim verification rules), apply or associate one or more edits to the claim form 103. The edit(s) applied to the claim form 103 may be based on edits specific to the payer 104 that the claim form 103 is being submitted or based on a reduced set of edits according to the principles of the present invention. The results of the processing of the claim form 103 may be stored in a database 434 with or without the claim form 103 in an object oriented or other format. The I/O unit 428 may communicate the processed claim form 103 and any associated edits or other information to the payer server 404 via the network 408 in data packets 436.

The payer server 404 may include generally the same hardware as the provider server 402, including a processor 438 coupled to a memory 440, I/O unit 442, and storage unit 444. The processor 438 may execute software 446 to process the claim forms 103 received for adjudication by the payer 104. The I/O unit 442 may receive the claim form 103 via data packets 436 and communicate the claim form 103 to the processor 438. The software 446 may utilize objects to verify the information of the claim form 103 and associated edit(s), if any, to adjudicate the validity of the claim for reimbursement to the provider 102 or patient. In accordance with the principles of the present invention, a consolidated set of edits may be utilized to reduce processing time. Alternatively, a reduced set of edits specific to the payer 104 may be utilized. A database 448 may be utilized to store (i) the submitted claim form 103, (ii) results of the verification, and (iii) results of the adjudication process in object oriented or other format. Accordingly, a rejected claim may be communicated to the provider server 402 via the clearinghouse server 406 or directly to the provider server 402 by the I/O unit 442. It should be understood that other or additional servers may be utilized in accordance with the principles of the present invention to generate and/or apply the consolidated set of edits to the submitted claim forms 103.

Figure 5:
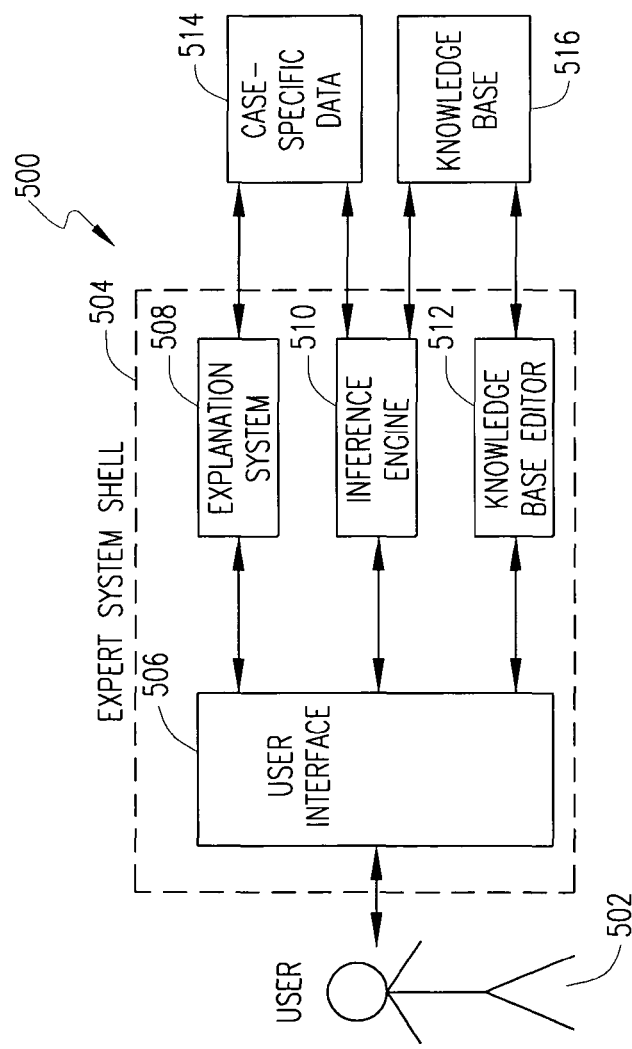
FIG. 5 is an exemplary block diagram model describing a rules-based system for generating the consolidated edit list for processing claims by the healthcare entities of FIG. 1C.

FIG. 5 is an exemplary block diagram model describing a rule based system 500. A user 502 may operate the rule-based system 500, which may include an expert system shell 504 having high-level modules that are generally included in rule-based systems as understood in the art. The expert system shell 504 may include a user interface 506, explanation system 508, inference engine 510, and knowledge base editor 512.

Almost all expert systems also have an explanation system 508, which allows the system 500 to explain its reasoning to the user 502. The inference engine 510 may be utilized to generate knowledge of the information provided thereto as understood in the art. The explanation system 508 and the inference engine 510 may be coupled to case specific data 514 containing specific information related to the problem being solved (e.g., reduction in the number of edits). The knowledge base editor 512 helps the expert or knowledge engineer to easily update and check a knowledge base 516 that is provided or formed. The knowledge base 516 may be made up of a collection of facts and rules that constitute the information model usable by the system 500.

In operation, the user 502 interacts with the system 500 via a user interface 506 that may be graphical (e.g., graphical user interface (GUI)), natural language or any other style of interaction. The inference engine 510 may be used to reason with both the expert knowledge (extracted from an expert in the field) and data specific to the particular problem being solved. The inference engine 510 may allow the user 502 to test rule conditions and add new information for the system 500 to use as it is executing. The expert knowledge is typically in the form of a set of IF-THEN rules. The case specific data 514 includes both data provided by the user 502 and partial conclusions (along with certainty measures) based on this data. In a simple forward chaining rule-based system, the case specific data are the elements in working memory.

One feature of expert systems is the way domain specific knowledge is separated from more general purpose reasoning and representation techniques. The general purpose reasoning may be referred to as the expert system shell 504. Given a new kind of problem to solve (e.g., reduction in edits), an expert system shell 504 that provides the right sort of support for that problem may be composed, so that expert knowledge may be provided to solve the problem. As understood in the art, commercially available expert systems are available to reduce development time.

The system 500 may be executed on one of the servers of the distributed network 400. Alternatively, the system 500 may be executed on an independent computing system (not shown). The processes of FIGS. 6 and 7 may be utilized with the rule-based system 500.

Figure 6:
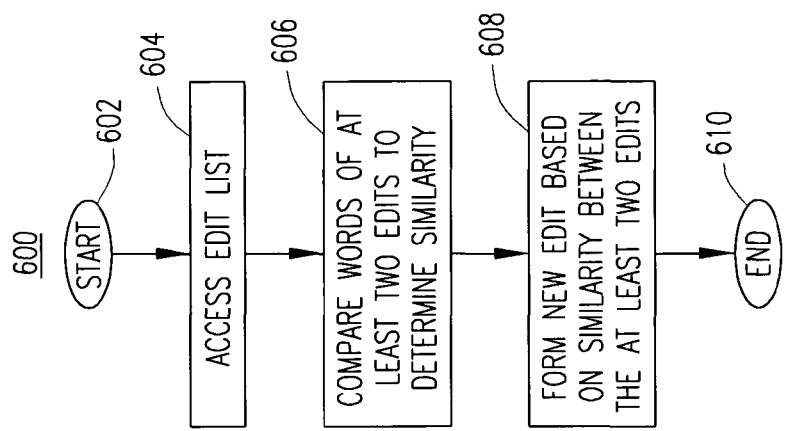
FIG. 6 is an exemplary flow diagram that generally describes a process for consolidating edits to form a consolidated edit list to be utilized in improving the efficiency of the claims filing process for the healthcare entities of FIG. 1C.

FIG. 6 is an exemplary flow diagram 600 that generally describes a process for consolidating edits to form a consolidated edit list to be utilized in improving the efficiency of the claims filing process 200 for the healthcare entities of FIG. 1C. The consolidation process starts at step 602. At step 604, an edit list is accessed. The edit list may be a complete edit list encompassing all edits possible in the medical field, a partial edit list encompassing edits possible in a medical specialty, or a partial edit list encompassing edits applicable to one or more payers 104. Other complete or partial lists may be utilized for consolidation according to the principles of the present invention. In accessing the edit list, the edit list may be stored in a database (e.g., database 430 or 424) and read into memory, received via a communication, or gathered by querying one or more storage units or computing devices maintaining lists of edits.

At step 606, words of at least two edits are compared to determine similarity and/or semantic similarity. The comparison may be performed as understood in the art. One embodiment may include forming tokens for each word of an edit and comparing the tokens. The comparison may include comparing a single edit to each other edit of the edit list. The similarity may be a degree of similarity based on the intersection of the words being compared. Alternatively, the similarity may be based on the words and synonyms of those words. Still yet, words being substantially semantically similar (e.g., copy and move) may be used for the comparison. The degree of similarity may be a discrete value indicative of a ratio or percentage formed by the intersection of words as determined by the comparison divided by the total number of words of the two edits being compared. A scale may be utilized in the comparison process to establish the degree of similarity and, optionally, a symbolic description may be applied to the edits for later usage in consolidating similar edits. In one embodiment, a Likert scale as shown in TABLE 1 may be utilized in forming the symbolic description. The edits may be sorted by similarity to assist in the consolidation process.

TABLE 1

| Likert Scale | |
|---|---|
| Range (percent) | Symbolic Description |
| 91-100 | Significant Similarity |
| 81-90 | High Similarity |
| 61-80 | Moderate Similarity |
| 40-60 | Marginal Similarity |
| 0-20 | Insignificant Similarity |

At step 608, a new or single edit may be formed based on the similarity between the at least two edits. The single edit may include at least a portion of each edit being consolidated into the single edit. In other words, the single consolidated edit may be the union of two or more edits being combined to form the single edit. The consolidated edit may be written to the database 434. The process ends at step 610.

Figure 7:
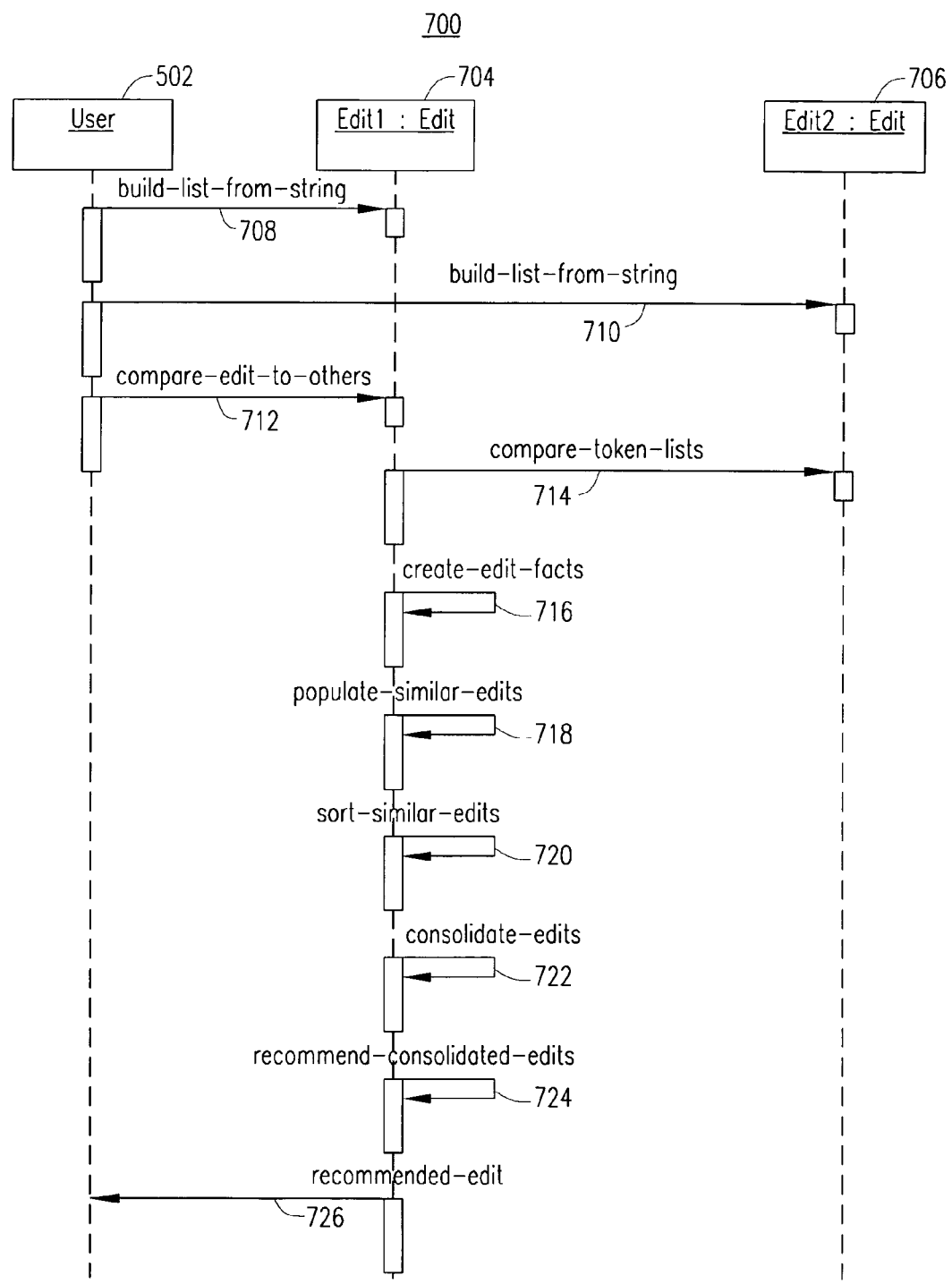
FIG. 7 is an exemplary process diagram describing the process of forming the consolidated edit list to more efficiently process claims submitted on the distributed network of FIG. 4.

FIG. 7 is an exemplary object interaction diagram 700 describing the process of forming the consolidated edit list to more efficiently process claims submitted on the distributed network 400 of FIG. 4. A user 502 may utilize the process composed of software to form the consolidated edit list. In one embodiment, the software is coded in an object oriented format to represent or model the edits, rules, fields, etc., in an object format in FIG. 3.

Two instances of the edit object 302 may be formed as Edit1 object instance 704 and Edit2 object instance 706 (i.e., the edit objects 704 and 706 are instantiated). In one embodiment, to form the edit objects, edits are inserted into a hash table keyed to the edit strings and the two edit object instances 704 and 706 may be generated with edit strings from the hash table keys. The edit consolidation process 600 starts at step 608, where the user commands the Edit1 object instance 704 to build a list of words from the edit string associated with the object. In one embodiment, the list of words are tokens containing each word of the edit string. At step 710, the user commands the Edit2 object instance 706 to build a list of words from the edit string associated with the object. The command may instruct some or all of the edit objects that are to be compared to the Edit1 object instance 704.

EXHIBIT 1 provides an exemplary instance of an edit object 302 of FIG. 3 formed from an exemplary Medicare edit. The instantiated Medicare edit (i.e., instance of the Medicare edit object) of EXHIBIT 1 is designated MEDICARE-EDIT 576968652 and includes the edit string "FOR MEDICARE INPATIENT CLAIMS TOB 12X AND REVENUE CODE 42X EXISTS THEN OCCURRENCE CODE 29 MUST EXIST," which, in essence, specifies the correction to be made if a claim validation rule is violated by the information entered into the claim form 103.

| EXHIBIT 1. Instantiated Medicare Edit | |
|---|---|
| #<db-instance MEDICARE-EDIT 576968652> is a MEDICARE-EDIT | |
| ERROR-CODE | NIL |
| EDIT-CODE | NIL |
| EFFECTIVE-DATE | NIL |
| SUPERSESSION-DATE | NIL |
| BILL-ELEMENT | NIL |
| COMMENT | NIL |
| BILL-TYPE | NIL |
| VALID-DATA | NIL |
| CARDINALITY | 0 |

| EXHIBIT 1. Instantiated Medicare Edit | |
|---|---|
| UB-92-COLUMN | "NA" |
| EDIT-RULES | NIL |
| EDIT-FACTS | NIL |
| SUPERSEDING-EDIT | NIL |
| EDIT-CATEGORY | NIL |
| EDIT-STRING | "FOR MEDICARE INPATIENT CLAIMS TOB 12X AND REVENUE CODE 42X EXISTS THEN OCCURRENCE CODE 29 MUST EXIST" |
| PAYER | NIL |
| METHOD-OF-SUBMISSION | NIL |
| PATIENT-TYPE | NIL |
| 837-DATA-SEGMENT | NIL |
| ORIGINATOR | "SLU" . . . |

At step 712, the user 502 commands the instantiated Edit1 object 704 to compare the edit to other edits (i.e., compare the edit strings via the tokens or token list to tokens of other edits). The Edit1 object 704 compares the associated tokens with tokens of the Edit2 object 706 at step 714. In making the comparison, the software (e.g., software 432) may utilize an inference engine or an instance of a pattern matcher class to assist in rule processing, where rules and assertions may be maintained in assertion and rule attributes of the edit objects 704 and 706. During edit comparison, each edit or edit object 704 and 706 assesses the similarity of the associated tokens to the tokens of the other edit being compared. In one embodiment, the Likert scale is used in converting the ratio or percentage of similarity to a symbolic representation of the similarity (See, for example, TABLE 1).

Each edit involved in a comparison with other edits creates facts that indicate the symbolic similarity to other edits. EXHIBIT 2 provides examples of results of comparisons of edits. As shown, each of the edits have ratios above 0.81 (81 percent) and below 0.90 (90 percent), thereby indicating that the edits all have "high similarity" to the edit that is performing the comparison.

| EXHIBIT 2. Edit Comparison Ratios |
|---|
| (#<db-instance MEDICARE-EDIT 576977460> 0.8571428571428571) |
| (#<db-instance MEDICARE-EDIT 576981212> 0.8235294117647058) |
| (#<db-instance MEDICARE-EDIT 576972788> 0.8125) |
| (#<db-instance MEDICARE-EDIT 576961092> 0.8235294117647058) |
| (#<db-instance MEDICARE-EDIT 576996484> 0.8823529411764706) |

At step 716, the Edit1 object 704 initiates the process of creating edit facts. EXHIBIT 3 provides examples of similarity facts for the edits that are created based on results of comparisons of different edits. The facts may be in the form of "<Edit 1> has (degree of similarity) similarity to <Edit 2>." Where (Degree of similarity) is an arbitrarily assigned value similar to those found in a Likert Scale. For example a similarity between 0.9 and 1.0 may be considered HIGH, a similarity between 0.8 and 0.89 may be considered MODERATE, a similarity between 0.6 and 0.79 may be considered MARGINAL, and a similarity between 0.0 and 0.59 may be considered MINIMAL. As indicated, the edit object performing the comparison is MEDICARE-EDIT 576968652. The MEDICARE-EDIT objects being compared are 576961092, 576996484, 576972788, 576981212, and 576977460. "SLU" is the code used to represent the provider, or originator of the edit 104.

| EXHIBIT 3. Examples of Similarity Facts Based on Comparison |
|---|
| EDIT #<db-instance MEDICARE-EDIT 576968652> FOR "SLU" HAS HIGH SIMILARITY TO EDIT #<db-instance MEDICARE-EDIT 576961092> FOR "SLU" |
| EDIT #<db-instance MEDICARE-EDIT 576968652> FOR "SLU" HAS HIGH SIMILARITY TO EDIT #<db-instance MEDICARE-EDIT 576996484> FOR "SLU" |
| EDIT #<db-instance MEDICARE-EDIT 576968652> FOR "SLU" HAS HIGH SIMILARITY TO EDIT #<db-instance MEDICARE-EDIT 576972788> FOR "SLU" |
| EDIT #<db-instance MEDICARE-EDIT 576968652> FOR "SLU" HAS HIGH SIMILARITY TO EDIT #<db-instance MEDICARE-EDIT 576981212> FOR "SLU" |
| EDIT #<db-instance MEDICARE-EDIT 576968652> FOR "SLU" HAS HIGH SIMILARITY TO EDIT #<db-instance MEDICARE-EDIT 576977460> FOR "SLU" |

The facts may be stored in assertion attributes of an inference engine object. In addition, the inference engine adds assertions provided in EXHIBIT 4. The assertions provide actions for handling different degrees of similarity. For example, edits with "high similarity" are to be automatically consolidated and edits with "marginal similarity" are to be manually reviewed.

| EXHIBIT 4. Assertions for Handling Edits |
|---|
| Consolidate edits with high similarity. |
| Consolidate edits with significant similarity. |
| Manually-review edits with marginal similarity. |
| Separately-implement edits with slight similarity. |
| Separately-implement edits with no similarity. |

At step 718, the Edit1 object 704 initiates populating similar edits into the Edit1 object 704. In populating the similar edits into the Edit1 object 704, the inference engine loads a single rule of the form shown in EXHIBIT 5. The rule determines how edits are to be processed. The edit class has methods defined for each of the actions.

| EXHIBIT 5. Rule |
|---|
| If <edit-1> has <level> similarity to <edit-2> and <action> edits with <level> similarity then <action> <edit-1> <edit-2> |

By utilizing the rule, the instantiated edit object of EXHIBIT 1 has a "EDIT-FACTS" attribute updated to include the edit strings of the similar edits as shown in EXHIBIT 6.

| EXHIBIT 6. Updated Edit Object with EDIT-FACTS |
| --- |

```
#<db-instance MEDICARE-EDIT 576968652> is a MEDICARE-EDIT
ERROR-CODE              NIL
EDIT-CODE               NIL
EFFECTIVE-DATE          NIL
SUPERSESSION-DATE       NIL
BILL-ELEMENT            NIL
COMMENT                 NIL
BILL-TYPE               NIL
VALID-DATA              NIL
CARDINALITY             0
UB-92-COLUMN            "NA"
EDIT-RULES              NIL
EDIT-FACTS
((EDIT #<db-instance MEDICARE-EDIT 576968652> FOR "SLU" HAS HIGH SIMILARITY
TO EDIT #<db-instance MEDICARE-EDIT 576961092> FOR "SLU")
(EDIT #<db-instance MEDICARE-EDIT 576968652> FOR "SLU" HAS HIGH SIMILARITY TO
EDIT #<db-instance MEDICARE-EDIT 576996484> FOR "SLU")
(EDIT #<db-instance MEDICARE-EDIT 576968652> FOR "SLU" HAS HIGH SIMILARITY TO
EDIT #<db-instance MEDICARE-EDIT 576972788> FOR "SLU")
(EDIT #<db-instance MEDICARE-EDIT 576968652> FOR "SLU" HAS HIGH SIMILARITY TO
EDIT #<db-instance MEDICARE-EDIT 576981212> FOR "SLU")
(EDIT #<db-instance MEDICARE-EDIT 576968652> FOR "SLU" HAS HIGH SIMILARITY TO
EDIT #<db-instance MEDICARE-EDIT 576977460> FOR "SLU"))
SUPERSEDING-EDIT        NIL
EDIT-CATEGORY           NIL
EDIT-STRING             "FOR MEDICARE INPATIENT CLAIMS TOB 12X AND
REVENUE CODE 42X EXISTS THEN OCCURRENCE CODE 29 MUST EXIST"
PAYER                   NIL
METHOD-OF-SUBMISSION    NIL
PATIENT-TYPE            NIL
837-DATA-SEGMENT        NIL
ORIGINATOR              "SLU"
```

At step 720, a consolidate method may sort edits in descending order of similarity and consolidate the token lists of the initial edit and the most similar edit at step 722. It may then iterate over the remaining similar edits identifying the different tokens that are to be accounted for in the single new edit being created. As shown in EXHIBIT 7, exemplary rules may be generated based on the rule (EXHIBIT 5) and assertions (EXHIBIT 4)

Based on the rules and consolidation assertions, a union forming a single edit using the token lists (i.e., words of the edit strings) produces a single edit as shown in EXHIBIT 8. The single edit in this case is constructed from five edits, thereby reducing the processing of the edits by a factor of 80 percent. A recommendation of the single, consolidated edit may be determined by the Edit1 object instance 704 at step 724 and recommended to the user 502 at step 726.

| EXHIBIT 7. Rules Generated by Rule and Assertions |
| --- |

Rule EDIT-ACTION-RULE indicates (CONSOLIDATE #<db-instance MEDICARE-EDIT 576925060> #<db-instance MEDICARE-EDIT 576937628>).
Rule EDIT-ACTION-RULE indicates (CONSOLIDATE #<db-instance MEDICARE-EDIT 576925060> #<db-instance MEDICARE-EDIT 576925580>).
Rule EDIT-ACTION-RULE indicates (CONSOLIDATE #<db-instance MEDICARE-EDIT 576925060> #<db-instance MEDICARE-EDIT 576951716>).
Rule EDIT-ACTION-RULE indicates (CONSOLIDATE #<db-instance MEDICARE-EDIT 576925060> #<db-instance MEDICARE-EDIT 576932428>).
Rule EDIT-ACTION-RULE indicates (CONSOLIDATE #<db-instance MEDICARE-EDIT 576925060> #<db-instance MEDICARE-EDIT 576962876>).
Rule EDIT-ACTION-RULE indicates (CONSOLIDATE #<db-instance MEDICARE-EDIT 576925060> #<db-instance MEDICARE-EDIT 576934508>).
Rule EDIT-ACTION-RULE indicates (CONSOLIDATE #<db-instance MEDICARE-EDIT 576925060> #<db-instance MEDICARE-EDIT 576936356>).
Rule EDIT-ACTION-RULE indicates (CONSOLIDATE #<db-instance MEDICARE-EDIT 576925060> #<db-instance MEDICARE-EDIT 576951116>).
Rule EDIT-ACTION-RULE indicates (CONSOLIDATE #<db-instance MEDICARE-EDIT 576925060> #<db-instance MEDICARE-EDIT 576972268>).

EXHIBIT 8. Single Edit Formed from Similar Edits (35 IS 50 VALUE |42X| 11 |44X| |22X| FOR MEDICARE INPATIENT CLAIMS TOB |12X| AND REVENUE CODE |43X| EXISTS THEN OCCURRENCE CODE 17 MUST EXIST)

The single edit may be utilized in the claims process by any of the entities, including provider 102, clearinghouse 106, or payer 104 to increase efficiency in processing the claims. By increasing the efficiency of processing the claims, the provider 102 may receive payment on the claims in a shorter period of time, thereby increasing the revenue stream to the provider 102.

In order to validate claims for the providers to receive payment, a claim element structure is created. A claim element provides a fundamental framework within which claim validation and adjudication policies may be specified. Each claim element includes a rules system component that allows the claim element to execute rules as well as share the knowledge attained by the rules with other claim elements.

Many types of claim elements may be formed, such as, for example, a reference claim element and a reported claim element. The reference claim element provides specific knowledge needed to enable claim validation. For example, a reference claim element may be instantiated with information from the claim forms and updates, such as, for example, Specification 837. The reported claim element represents instances of claim elements that are reported on a specific claim. The reported claim element creates a reference to the corresponding reference claim element in order to validate the reported claim element. The reported claim element may include a string that represents a particular portion of information on a claim form (e.g., a string of alphabetic characters for a patient name or a string of numeric characters for a patient birth date).

Figures 8, 9:
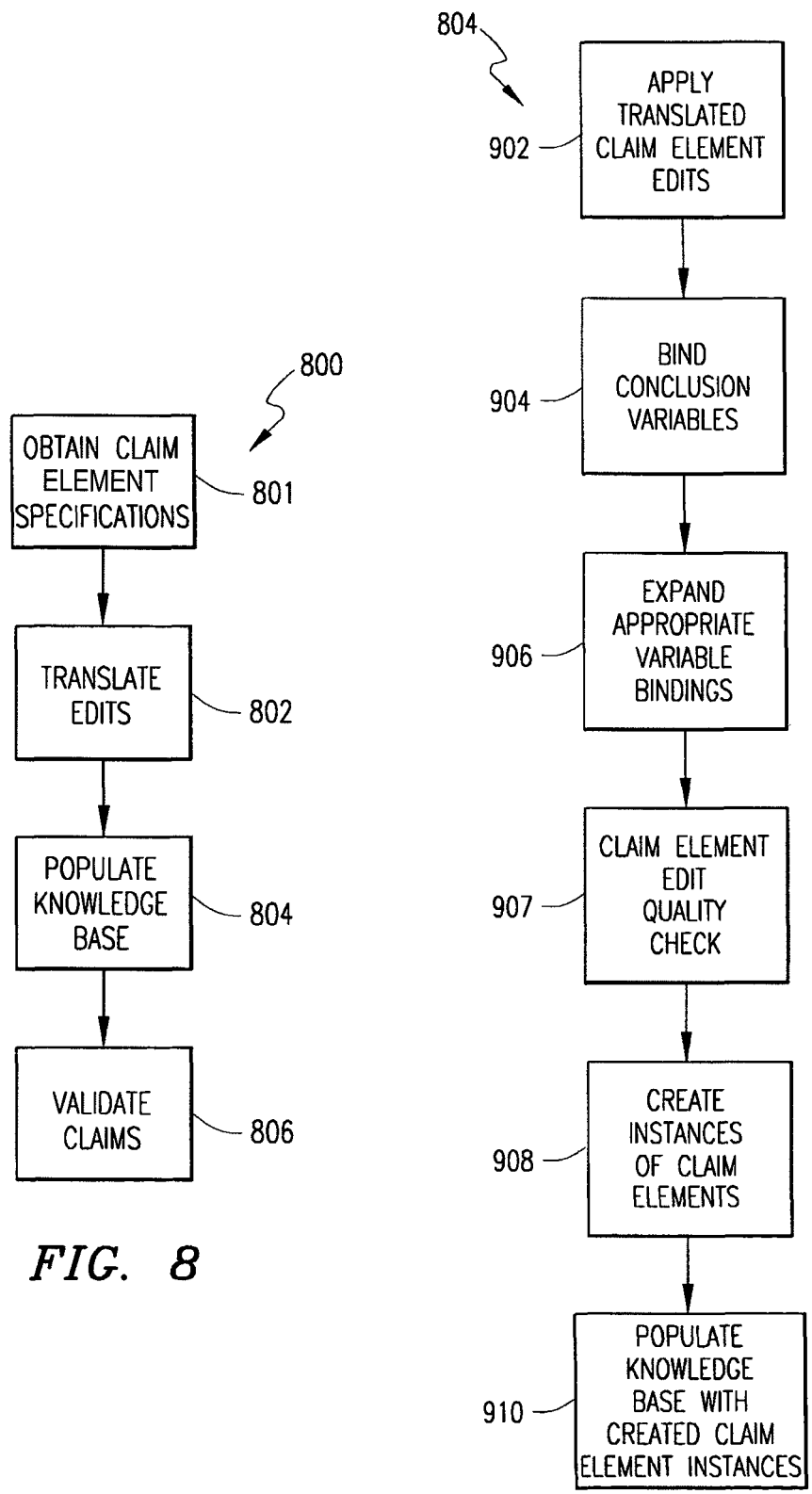
FIG. 8 is a flow diagram that illustrates an overall flow for populating a knowledge base and validating claims using knowledge in the populated knowledge base.
FIG. 9 is a flow diagram that illustrates in more detail step 804 of FIG. 8.

FIG. 8 is a flow diagram 800 that illustrates an overall flow for populating a knowledge base and validating claims using knowledge in the populated knowledge base. The knowledge base may be, for example, the knowledge base 516 of the system 500. To validate submitted medical claims, a set of rules and/or facts are established. The rules and facts may relate to claim forms such as the UB-92 and the HCFA 1500 as in FIGS. 1A and 1B. Additional periodic (e.g., quarterly or yearly) updates or specifications by payers also provide specific knowledge utilized to create the rules and facts. At step 801, claim element specifications are obtained from various sources such as, for example, NUBC, SUBC, CHAMPUS, CHAMPVA, and commercial health insurance carriers. From these specifications, facts and attributes may be deduced in order to create rules that are used to populate the knowledge base.

Attributes are given to the claim elements based on the information obtained from the specifications and updates. One claim attribute, "TITLE," lists the title given to the claim element (e.g., "Birth date"). Another attribute may be "ABBREVIATION," which includes a list of possible abbreviations utilized to refer to the claim element (e.g., "BD"). In the reference claim elements, a "VALID-VALUES" attribute is also assigned. The "VALID-VALUES" attribute includes a list of the possible values a claim element may comprise, when such information is provided in the specification, e.g., a valid date, a condition code, or a type of bill. The reported claim elements include a "VALUE" attribute that stores the actual value from a reported claim form (e.g., an actual reported birth date, such as Apr. 6, 1965).

At step 802, the information obtained from the claim element specifications is translated into edits in order to form knowledge to populate the knowledge base. For instance, one fact (edit) that may be deduced from Specification 837 is that a valid Medicare claim requires an entry in field 4 on the UB-92 form. Another exemplary fact (edit) for a valid Medicare claim is that field 4 on the UB-92 form has the title of "Type of Bill." In order to be able to more easily work with the edits, a translation grammar is used in the edit-translation 802. The translation of these facts yields the following translated claim element edits:

Medicare REQUIRES Field 4 ON UB-92

Field 4 OF UB-92 HAS TITLE Type of Bill.

The translation grammar includes identification of particular claim-element locations that must be populated under certain circumstances. The translation grammar also allows for abbreviations to be applied to the name of a code.

More specifically, the translation grammar facilitates the understanding of medical claims processing by creating a specific vocabulary and grammar suitable for use by computers and rule-based systems. The vocabulary is composed of a combination of words that are unique to the healthcare industry (e.g., condition code, occurrence code, form locator, patient, provider, etc.). In addition to the healthcare unique vocabulary, standard English language words are also used to communicate in business and informal daily interactions. The English language words are generally adjectives, nouns, verbs, and prepositions. Some examples of English language words used in the translation grammar are as follows:

Nouns: revenue code, service line, claim element, type of bill;

Verbs: requires, allows, excludes;

Prepositions: on, for, in, from, to;

Adjectives: value, range.

The nouns of the translation grammar are used to describe items of interest in the healthcare claim processing domain. The verbs describe relationships between the nouns in the domain. The translation grammar prepositions constrain the relationships described by the verbs and the adjectives are used to enhance the descriptions of the nouns.

The translation grammar describes legal patterns of usage for the vocabulary set forth above. The translation grammar is an adaptation of American English grammar patterns for declarative sentences. Each translation sentence is composed of a noun phrase, verb phrase and optional prepositional phrases. For example, the translation sentence "Revenue Code value 0420 requires Occurrence Code value 11 on TOB 14X includes the noun phrase "Revenue Code value 0420," the verb phrase "requires Occurrence Code value 11," and the prepositional phrase "on TOB 14X."

In addition, the translation grammar provides a mechanism that allows a computer to identify inconsistencies and assist a human operator in reducing such inconsistencies. For instance, the exemplary untranslated sentence "Reject Medicare outpatient if revenue code 42X exists and not occurrence code 11, 29, 35" is translated to three separate translations as follows:

Revenue Code value 42X requires Occurrence Code value 11 on TOB outpatient for payer Medicare.

Revenue Code value 42X requires Occurrence Code value 29 on TOB outpatient for payer Medicare.

Revenue Code value 42X requires Occurrence Code value 35 on TOB outpatient for payer Medicare.

A second exemplary untranslated sentence "Reject revenue code 42X exists and not value code 50" is translated into "Revenue Code value 42X requires Value Code value 50." The first exemplary untranslated sentence yields three translated sentences with each sentence including a noun phrase, a verb phrase, and two prepositional phrases. However, the second exemplary untranslated sentence yields one translated sentence with one noun phrase and one verb phrase. As shown by these examples, the first exemplary translated sentences are more precise and more restrictive than the second translated sentence. The translation grammar aids a human operator in identifying and correcting these inconsistencies as noted above.

A manual translation using the translation grammar is typically performed, although an automated translation may also be performed. The translation is performed on both the consolidated edits as well as individual edits that have required manual analysis. The translation grammar is used to translate the edits into translated claim element edits that may more readily be filtered by a set of knowledge-base-population rules. Once the translated edits have been generated, the translated claim element edits may be used in conjunction with the knowledge-base-population rules in order to populate the knowledge base. Following the edit translation of step 802, a file is typically produced that contains translated edits and their corresponding untranslated edits.

At step 804 the translated edits are used to populate the knowledge base. The attributes and/or values of the claim elements are assigned at steps 802 and 804 as appropriate. Rules are enacted by the claim elements to form knowledge that may be entered into the knowledge base. At step 806, knowledge in the populated knowledge base is used to validate claims. To validate claims, information from reported claim elements is checked against information from reference claim elements. For example, if the "VALUE" from a reported claim element is listed as one of the possible values in the "VALID-VALUES" attribute of the corresponding reference claim element, then the claim may be validated.

The knowledge created by the rules and utilized by the claim elements may be form-neutral or form-specific. For instance, the valid values for the patient name field, patient address field, birth date, etc. may be the same for both the UB-92 form and the HCFA 1500 form. The knowledge in the knowledge base may also map to various different fields on each claim form. In this way, updates and edits to the claim elements may apply to one or more claim element. An edit to the "VALID-VALUES" attribute of a patient name claim element for a UB-92 form also applies to the "VALID-VALUES" attribute of a patient name claim element for a HCFA 1500 form. The claim elements act as intelligent agents to update or edit other claim elements that may depend on or refer to the specific edited claim element (e.g., patient name claim element for a UB-92 form).

FIG. 9 is a flow diagram that illustrates in more detail step 804 of FIG. 8. Step 804 includes steps 902-910. At step 902, the translated edits obtained in step 802 are applied to knowledge-base-population rules in order to determine when the syntax of a given knowledge-base-population rule and syntax of the translated edit match. As previously mentioned, a claim element that is created for each blank on a claim form acts as an intelligent agent. The claim element has all of the translated edits that apply to the claim element as part of its context. Each Edit is an intelligent agent that uses the rule system component to apply the translated edits applicable to the claim element to the knowledge-base population rules in order to determine when a syntactical match has been found.

Once a syntactical match has been found, the knowledge-base is populated, as described in more detail below.

Each knowledge-base-population rule is given a unique name. Below is an example of a knowledge-base-population rule referred to as:

(Payer-requires-element-rule
(if (? payer) requires (? element) of (? form id) and (? element) of (? form id) has title (? title) then (? payer) requires (? title) on (? form id))

A question mark followed by a symbol inside of parentheses designates a variable (e.g., (? payer)). Therefore, (? payer), (? element), (? title), and (? form id) are all variables used by the Payer-requires-element-rule knowledge-base-population rule. A symbol without any parentheses around it is a constant of a pattern of the knowledge-base-population rule. Therefore, "requires," "on," and "has title" all are constants of the Payer-requires-element-rule knowledge-base-population rule. Each knowledge-base population rule represents a pattern that is a combination of both variables and constants in a specified order that is used by the intelligent-agent claim elements in a pattern-matching procedure.

For example, when applying the above knowledge-base population rule to the claim element edits "Medicare REQUIRES Field 4 ON UB-92" and "Field 4 OF UB-92 HAS TITLE Type of Bill," a conclusion, or knowledge, is developed based on the implied "then" statement. In this example, the variables (? payer), (? element), (? title), and (? form id) have the values of "Medicare," "Field 4," "Type of Bill," and "UB-92" respectively. The knowledge obtained by the implied "then" statement is that "Medicare requires Type of Bill on UB-92."

Returning to FIG. 9, at step 904, in response to a match between a translated edit and a knowledge-base population rule being found, the Edit or claim element can bind conclusion variables of the matching knowledge-base-population rule to the values of those variables in the translated edit of the claim element that resulted in the match. A method of the Edit is called using the conclusion from the matching knowledge-base-population rule. This method is the "Add-required-claim-element" method. A particular knowledge-base-population rule will only match assertions for a translated edit that has the exact same pattern as the knowledge-base-population rule. In the exemplary Payer-requires-element-rule knowledge-base-population rule, only if a translated edits matches the pattern (? payer) requires (? element) of (? form id) and the pattern (? element) of (? form id) has title (? title) will the variables following the conclusion of the rule be bound to the values of those variables found in the translated edit. In the example above, a match between the translated edit and the knowledge-base population rule results. Next, a method (i.e., Add-required-claim-element) is called. The Add-required-claim-element method is specialized for edit objects that match the pattern of the Payer-requires-element-rule knowledge-base-population rule and uses name-value pairs and other information instantiated by the Add-required-claim-element method. The Add-required-claim-element method performs the following functions: The method obtains an instance of a claim element from the knowledge base. If no such element exists a new element is created. When a new element is created, the element attributes Form-id and element title are populated from the parameters used in the method call. A method of the claim element is then activated to create the appropriate relationship fact for the specified payer. The relationship fact is then inserted into the knowledge base by the claim element. If the claim element is a newly created claim element, it must interact with a human user to acquire sufficient information to complete the claim element definition. Once the claim element definition is complete, the claim element writes its definition data to the knowledge base. The methods are the Edit's add-required-claim-element and the claim element's create-and-add-relationship methods.

When the pattern of a given knowledge-base-population rule is matched by a translated edit, the bound variables listed in the knowledge-base-population rule are instantiated by the method for the knowledge-base-population rule. When the variables are instantiated, the applicable conclusion of the knowledge-base-population rule is added to a set of edit-rule conclusions. The conclusions of all of the knowledge-base-population rules in which a pattern match has been found are executed via the corresponding methods. Applicable method calls cause SQL queries to be made that cause population of the knowledge base to occur.

Returning to FIG. 9, at step 906, appropriate variable bindings are expanded. As noted above, when a match between a translated edit and a knowledge-base population rule is found, the appropriate variables are bound to the values set forth in the translated edit. At step 906, those variable bindings are expanded so that each of the expanded translated edits (i.e., a plurality of translated edits that correspond to a single edit) includes the variable bindings. As previously described, some of the rules and attributes may be form-neutral, i.e., a patient name must be a string of alphabetic characters regardless of whether the patient name is listed on a UB-92 form or a HCFA 1500 form. Therefore, one edit (patient name must be alphabetic characters) may be expanded to edits for both the UB-92 form and the HCFA 1500 form. Of course, when there is a one-to-one correspondence between an untranslated edit and a corresponding translated edit, there is no need for any variable-binding expansion as in step 906 to occur.

The expansion of claim element edit translations focuses on the payers who require an entry in a particular claim element on a particular claim form. For example, a single edit can be constructed to indicate that a list of payers require a specific claim element (e.g., claim element SoA on the UB-92 form FL-20 is required by payer Medicare, BC, CHAMPUS, and Commercial). This exemplary claim element edit translation would be expanded to create a single statement of a fact for each payer as follows:

Claim element SoA on UB-92 FL-20 is required by payer Medicare;

Claim element SoA on UB-92 FL-20 is required by payer BC;

Claim element SoA on UB-92 FL-20 is required by payer CHAMPUS; and

Claim element SoA on UB-92 FL-20 is required by payer Commercial.

Once the edit has bee expanded, the Payer-requires-claim-element-rule can determine that a required claim element should be added for the specified payers.

A standard list of abbreviations is used to provide for expansion of abbreviated information that has been instantiated in a variable. For example, the Payer-requires-claim-element-rule would instantiate the variable (? Title) to SoA. The abbreviation SoA would expand into the claim element title Source of Admission. In a similar manner, the variable (? Payer) would be instantiated to BC which expands to Blue Cross.

At step 907, a translated-edit quality check is performed. The quality check of step 907 includes a check to determine that the variable bindings have been correctly bound and expanded. As described above, embodiments of the invention permit edits to be compared to one another via the contents of their edit strings and determining their level of similarity. In order to verify that the variable bindings have been appropriately bound and expanded the variable bindings, pattern matching may be employed.

The expanded translations are first iterated through using pattern matching with the corresponding translated edit prior to expansion. If the pattern matcher fails on every instance of the expanded translated edit, it has been verified that at least one modification has been made to each of the translated edits relative to the corresponding unexpanded translated edit.

Next, the similarity of the expanded translated edits is compared to the variable bindings of the original structure of the unexpanded translated edit so that it can be determined whether a predetermined level of structural similarity exists between the expanded translated edits and the unexpanded translated edit. If both of the sub-steps of step 907 yield sufficient results, the translation and expansion of the edits are deemed to have been correctly performed.

At step 908, instances of claim elements (e.g., claim element titled "Birth date") that include the information bound to the matching conclusions are created. For example, one conclusion for a Birth date claim element may be that only numeric characters are valid values. Another conclusion may be that only a specific format of the birth date may be allowed (e.g., two-digit month/two-digit day/four-digit year). Conclusions may also be the element number (e.g., the place on the form (UB-92 or HCFA 1500) that the claim element may be found), a description of the claim element, or whether the claim element may be multi-valued. All of these conclusions may be bound to the claim element as attributes to create instances of the claim elements. At step 910, the knowledge base is populated with the information contained in the claim element instances. The knowledge-base-population rules are used to identify where the knowledge from each of the translated edits needs to be placed in the knowledge base. The called methods add information from the translated edit into the knowledge base in the appropriate place.

One of the advantages of embodiments of the present invention is that it is not necessary to rewrite the knowledge-base-population rules when edit changes occur. Principles of the present invention permit the knowledge base to be readily updated in the event that changes are made with respect to how a given claim form must be filled out, wherein an update is considered to be a type of knowledge-base population. The translation grammar is generalized so that a translated edit may be created for a given change and the grammar may be used to identify where the translation needs to be placed in the knowledge base. Furthermore, the knowledge may be form neutral, allowing updates and edits to map over to each claim form, thereby decreasing the number of necessary edits and allowing the information from one form layout (i.e., UB-92) to be readily transformed to another form layout (i.e., HCFA 1500).

The previous description is of a preferred embodiment for implementing the invention, and the scope of the invention should not necessarily be limited by this description. The scope of the present invention is instead defined by the following claims.

What is claimed is:

1. A method of populating a knowledge base, the method comprising:

creating at least one claim element based on information related to a field from a claim form for an insurance provider, the at least one claim element comprising a reference claim element;

wherein the at least one claim element comprises at least one edit deduced from the information related to the field from the claim form, an edit comprising a directive of an insurance provider to correct or reject an insurance claim under specified circumstances;

applying at least one knowledge-base-population rule to the at least one edit to form claim-processing knowledge for the at least one claim element;

wherein the application comprises determining a match between a pattern of the at least one edit and a pattern of the at least one knowledge-base-population rule;

wherein the claim-processing knowledge comprises one or more conclusions specified by the at least one knowledge-base-population rule based on the determined match;

populating the knowledge base with said claim-processing knowledge acquired from said application, the knowledge base being resident in a computer-readable storage medium in a computing system;

wherein the population comprises at least one of creating and updating an instance of the at least one claim element with the claim-processing knowledge; and wherein the creating, the performing, and the populating are performed via at least one computer in the computing system comprising a processor and memory.

2. The method of claim 1, further comprising translating an edit to yield a translated edit, the translated edit being utilized in the step of creating the at least one claim element, the at least one edit comprising the translated edit.

3. The method according to claim 1, further comprising binding at least one conclusion variable of the at least one knowledge-base-population rule responsive to the application of the at least one knowledge-base-population rule.

4. The method according to claim 3, wherein the creation of the at least one claim element comprises:
   creating at least one attribute; and
   assigning at least one value to said at least one attribute.

5. The method according to claim 1, further comprising validating a claim using appropriate claim-element knowledge in the populated knowledge base.

6. The method according to claim 1, wherein the creation of the at least one claim element comprises:
   creating at least one reported claim element.

7. The method according to claim 6, further comprising validating a claim by comparing said at least one reported claim element to said at least one claim element.

8. The method according to claim 2, further comprising verifying that the translated edit has been correctly translated.

9. An article of manufacture for populating a knowledge base used in validating medical claims, the article of manufacture comprising:
   at least one computer readable medium;
   processor instructions included on the at least one computer readable medium, the processor instructions configured to be readable from the at least one computer readable medium by at least one processor and thereby cause the at least one processor to operate as to:
      create at least one claim element based on information related to a field from a claim form for an insurance provider, the at least one claim element comprising a reference claim element;
      wherein the at least one claim element comprises at least one edit deduced from the information related to the field from the claim form, an edit comprising a directive of an insurance provider to correct or reject an insurance claim under specified circumstances;
      apply at least one knowledge-base-population rule to the at least one edit to form claim-processing knowledge for the at least one claim element;
      wherein the application comprises a determination of a match between a pattern of the at least one edit and a pattern of the at least one knowledge-base-population rule;
      wherein the claim-processing knowledge comprises one or more conclusions specified by the at least one knowledge-base-population rule based on the determined match;
      populate the knowledge base with said claim-processing knowledge acquired from said application; and
      wherein the population comprises at least one of creating and updating an instance of the at least one claim element with the claim-processing knowledge.

10. The article of manufacture of claim 9, further comprising processor instructions configured to cause the at least one processor to operate as to translate an edit to yield a translated edit, the translated edit being utilized in the step of creating the at least one claim element, the at least one edit comprising the translated edit.

11. The article of manufacture of claim 9, further comprising processor instructions configured to cause the at least one processor to operate as to create at least one attribute and to assign at least one value to said at least one attribute.

12. The article of manufacture of claim 9, wherein the creation of the at least one claim element comprises:
   creating at least one reported claim element.

13. The article of manufacture of claim 9, further comprising processor instructions configured to cause the at least one processor to operate as to validate a claim using appropriate claim-element knowledge in the populated knowledge base.

14. The article of manufacture of claim 10, further comprising processor instructions configured to cause the at least one processor to operate as to verify whether the translated edit has been correctly translated.

15. The method of claim 1, wherein the at least one claim element includes a plurality of edits, the plurality of edits representing situations that hinder claim payment by a payer.

16. The method of claim 15, wherein the applying step comprises applying the at least one knowledge-base-population rule to at least one of the plurality of edits to acquire the claim-processing knowledge.

17. The method of claim 15, wherein the plurality of edits comprises a plurality of translated edits, wherein at least one translated edit in the plurality of translated edits represents at least a portion of an edit in a syntactical form that facilitates application of a knowledge-base-population rule applied thereto.

18. The article of manufacture of claim 11, wherein the at least one claim element includes a plurality of edits, the plurality of edits representing situations that hinder claim payment by a payer.

19. The article of manufacture of claim 18, wherein the application of the knowledge-base-population rule comprises application of the at least one knowledge-base-population rule to at least one of the plurality of edits to acquire the claim-processing knowledge.

20. The article of manufacture of claim 18, wherein the plurality of edits comprises a plurality of translated edits, wherein at least one translated edit in the plurality of translated edits represents at least a portion of an edit in a syntactical form that facilitates application of a knowledge-base-population rule applied thereto.

21. A method comprising:
creating a plurality of claim elements based on a plurality of fields from a plurality of claim forms, the plurality of claim elements comprising a plurality of edits, the plurality of edits representing one or more situations that hinder claim payment by a payer;
for each of the plurality of claim elements, applying one or more knowledge-base-population rules for a knowledge base to at least some of the plurality of edits to form claim-processing knowledge for the plurality of claim elements; and
populating the knowledge base with the claim-processing knowledge acquired from the applying step, the knowledge base being resident in a computer-readable storage medium in a computing system;
wherein the creating, the performing, and the populating are performed via at least one computer in the computing system comprising a processor and memory.

22. The method of claim 21, wherein the plurality of edits comprises a plurality of translated edits, wherein at least one translated edit in the plurality of translated edits represents at least a portion of an edit in a syntactical form that facilitates application of a knowledge-base-population rule applied thereto.

* * * * *